(12) United States Patent  
Hayashi et al.

(10) Patent No.: US 7,815,357 B2  
(45) Date of Patent: Oct. 19, 2010

(54) LIGHT GUIDE FOR SURFACE LIGHT SOURCE DEVICE AND SURFACE LIGHT SOURCE DEVICE

(75) Inventors: Kentaro Hayashi, Kanagawa (JP); Tomoyoshi Yamashita, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 261 days.

(21) Appl. No.: 11/663,767

(22) PCT Filed: Sep. 27, 2005

(86) PCT No.: PCT/JP2005/017691

§ 371 (c)(1), (2), (4) Date: Mar. 26, 2007

(87) PCT Pub. No.: WO2006/035743

PCT Pub. Date: Apr. 6, 2006

(65) Prior Publication Data

US 2008/0031011 A1  Feb. 7, 2008

(30) Foreign Application Priority Data

Sep. 28, 2004  (JP)  ............... 2004-282151

(51) Int. Cl.  
*F21V 7/04* (2006.01)

(52) U.S. Cl. .............. 362/606; 362/608; 362/609; 362/618; 362/620; 362/633; 362/634; 362/800; 349/64; 349/65; 359/599

(58) Field of Classification Search .............. 362/606, 362/608, 609, 618, 620, 633, 634, 800; 349/65, 349/64; 359/599  
See application file for complete search history.

(56) References Cited

U.S. PATENT DOCUMENTS

| | | | | |
|---|---|---|---|---|
| 5,718,497 A | * | 2/1998 | Yokoyama et al. | 362/625 |
| 5,854,872 A | * | 12/1998 | Tai | 385/133 |
| 6,791,566 B1 | | 9/2004 | Kuratomi et al. | |
| 2002/0163790 A1 | | 11/2002 | Yamashita et al. | |

(Continued)

FOREIGN PATENT DOCUMENTS

JP  5-6401 U  1/1993

(Continued)

*Primary Examiner*—Sandra L O'Shea  
*Assistant Examiner*—Mary Zettl  
(74) *Attorney, Agent, or Firm*—Morgan, Lewis & Bockius LLP

(57) ABSTRACT

A high quality surface light source in which various kinds of unevenness in luminance due to use of small number of spot-like primary light sources for reducing power consumption is eliminated, and a light guide for use therein. The planar light guide (4) guides light emitted from a plurality of spot-like primary light sources (2) and has an incoming end face (41) of lights emitted from the primary light source (2) and an outgoing face (43) of guided light. A high light diffusion region (431) extends substantially along the direction of directivity of light entering the light guide (4) in a plane extending along the outgoing face (43), in the vicinity of the incoming end face of at least one of the outgoing face (43) and its rear surface (44) on the opposite side. The high light diffusion region (431) has a mean inclination angle larger than that of an adjacent region (434).

9 Claims, 16 Drawing Sheets

U.S. PATENT DOCUMENTS

| | | |
|---|---|---|
| 2003/0076669 A1 * | 4/2003 | Itoh et al. .................... 362/31 |
| 2004/0136173 A1 * | 7/2004 | Tsai ........................... 362/31 |
| 2004/0228603 A1 * | 11/2004 | Chen ......................... 385/146 |
| 2005/0174803 A1 | 8/2005 | Hayashi et al. |

FOREIGN PATENT DOCUMENTS

| | | | |
|---|---|---|---|
| JP | 7-27137 | B | 3/1995 |
| JP | 7-270624 | A | 10/1995 |
| JP | 8-179322 | A | 7/1996 |
| JP | 9-160035 | A | 6/1997 |
| JP | 2002-055675 | | 2/2002 |
| JP | 2004-6326 | A | 1/2004 |
| WO | 02-48608 | A1 | 6/2002 |

* cited by examiner

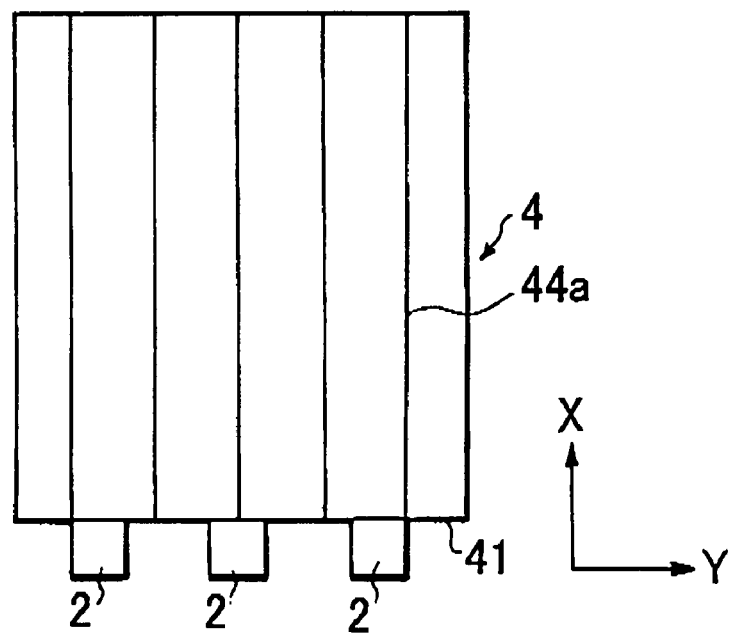
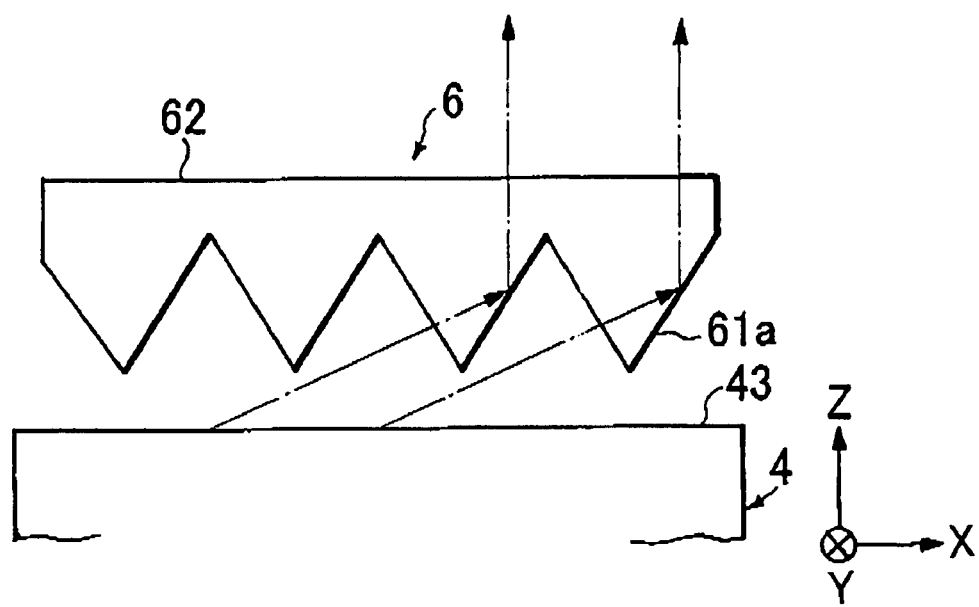

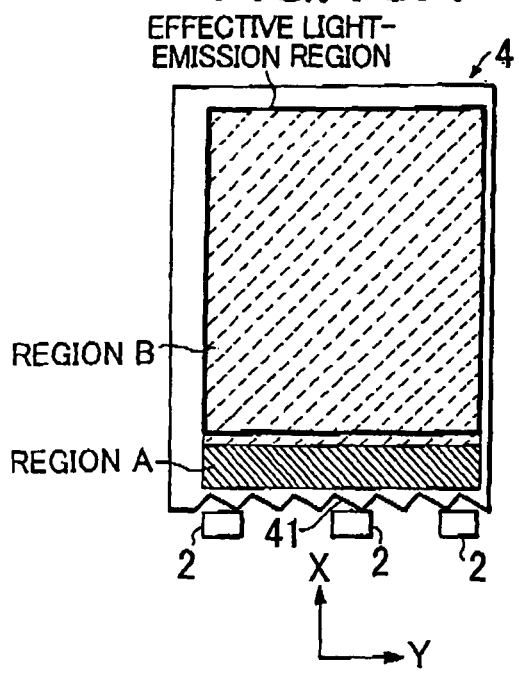
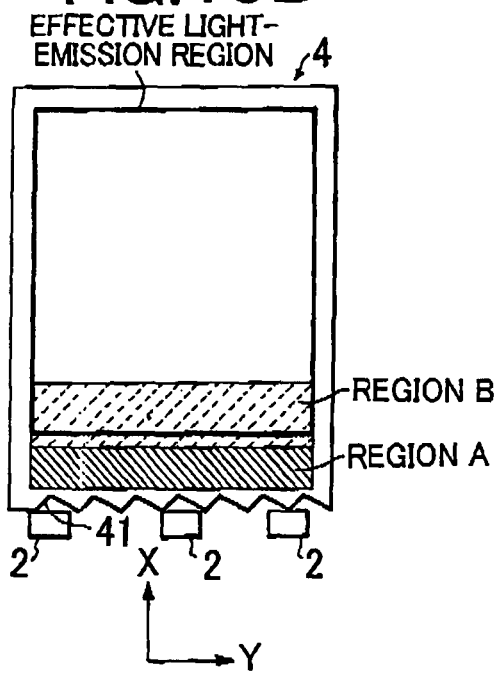
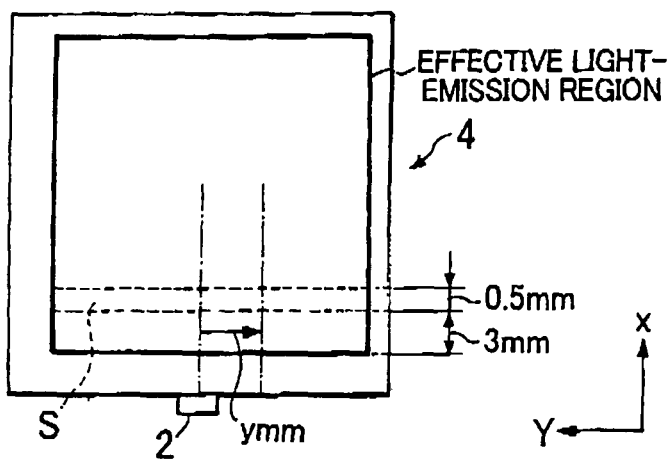

LIGHT GUIDE FOR SURFACE LIGHT SOURCE DEVICE AND SURFACE LIGHT SOURCE DEVICE

TECHNICAL FIELD

The present invention relates to a surface light source device of an edge-light type and a light guide for use in the surface light source device. More particularly, the invention relates to a surface light source device designed to be small and to consume little power. The surface light source device according to the present invention is fit for use as a surface light source device in a relatively small liquid crystal display device that is used as a display panel for portable electronic apparatuses such as cellular telephones and portable game apparatuses and as an indicator for various apparatuses.

BACKGROUND ART

In recent years, liquid crystal display devices have been used widely in various fields, as monitors for portable notebook-type personal computers, display units of liquid crystal television receivers or liquid crystal television receivers with video recorder, and the like. A liquid crystal display device is basically constituted by a backlight unit and a liquid crystal display unit. In most cases, the backlight unit is of edge-light type. This is because the edge-light type helps to make the display device compact. The conventional backlight unit includes a light guide shaped like a rectangular plate and a linear or rod-shaped primary light source. At least one end face of the light guide functions as light-incoming face. The primary light source is, for example, a linear fluorescent lamp and extends along the light-incoming face of the light guide. The primary light source emits light, which is incident on the light-incoming face of the light guide, introduced into the light guide and emitted from one of the two major surfaces of the light guide, i.e., the light-outgoing face.

In recent years, it has been demanded that liquid crystal display devices having a relatively small screen, e.g. portable electronic apparatuses such as cellular telephones and portable game apparatuses or indicators on various electric and electronic apparatuses, should be small and consume but a little power. To reduce the power consumption, light-emitting diodes (LEDs), which are spot light sources, are used as primary light source in backlights. As disclosed in JP-7-270624-A (Patent Document 1), a backlight using LEDs as primary light source has a plurality of LEDs that are arranged in one-dimensional array along the light-incoming face of a light guide so that the backlight may perform the same function as a backlight having a linear light source. If such a backlight including a plurality of LEDs arranged in one-dimensional array is used, a desired amount of light and luminance uniformity over the screen can be attained.

It is demanded that the power consumption in such a small liquid crystal display be reduced further. To meet this demand, the LEDs used must be decreased in number. If less LEDs are used, however, the distance between the light-emitting points of the primary light source will become longer. The region of the light guide adjacent to the region between the light-emitting points will expand, inevitably decreasing the intensity of the light emitted from such a region of the light guide in a desired direction. This results in non-uniformity (i.e., luminance non-uniformity) of distribution in luminance in a viewing direction with respect to the light-emitting surface of the surface light source device.

JP-7-27137-5 (Patent Document 2) proposes a method in which a light guide having a rough light-outgoing face is used, and a prism sheet having an array of prisms is laid on the light-outgoing face of the light guide, with the prism face opposing the light guide, thereby to reduce the power consumption of the backlight and limit the distribution of output light not to sacrifice the luminance so much. This backlight can indeed provide high luminance at low power consumption. However, luminance non-uniformity may be conspicuous, visually seen through the prism sheet.

Of the luminance non-uniformity, the most problematical is such a shadow (dark region) as shown in FIG. 27, which develops in the light-guide at regions thereof corresponding to areas lying outside the LEDs 2 at the ends of an LED array or to areas between the adjacent LEDs 2. The dark region may be so large that it can be seen even in the effective light-emission region of the backlight, which corresponds to the screen of the liquid crystal display device. In this case, the backlight is greatly degraded in quality. The dark region will be more likely seen in the effective light-emission region if the number of LEDs used is decreased in numbers in order to reduce the power consumption, or if the distance between the LEDs and the effective light-emission region is shortened in order to make the display small. This luminance non-uniformity is inevitable, because the light bears emitted from the LEDs arranged adjacent on the light-incoming face of the light guide have directivity and diverge but a little in the light guide as they refract when being incident on the light guide. Further, what can be seen in the direction normal to the light-outgoing face are only the light beams that are substantially perpendicular to the prisms arrayed on the prism sheet. Inevitably, the light observed diverges lass than the light actually emitted from the light guide. Thus, the conventional backlight that uses spot light sources as primary light source can hardly achieve both a reduction in power consumption and the uniformity of luminance distribution.

In a backlight that uses, as primary light source, a linear light source such as a cold cathode-ray tube, the dark region in the vicinity of the light-incoming face may be illuminated by such a method as disclosed in, for example, JP-9-160035-A (Patent Document 3). In this method, the light-incoming face of the light guide is roughened. This method cannot sufficiently reduce the dark region in the backlight that uses spot light sources, such as LEDs, as primary light source.

JP-5-6401-U (Patent Document 4) and JP-8-179322-A (Patent Document 5) propose backlights having a linear light source such as a cold cathode-ray tube. In these backlights, many prisms extending in a direction perpendicular to the light-incoming face are arranged in an array on the light-outgoing face or on the opposite face, for the purpose of converging the light coming from a light guide with respect to a direction parallel to the light-incoming face. In the light guide having such a prism array, the introduced light is internally reflected by the prism so as to increase or decrease an angle between a direction of the reflected light and direction of incident light on the light guide. Hence, the light introduced into the light guide converges in an extending direction of the prism. The luminance can therefore increase. If such a light guide is introduced into a backlight having LEDs, the light introduced into the light guide will diverge as it is, reflected by the prism array provided on the light guide. The light which diverges is emitted from the light guide substantially in a direction Perpendicular to the prism provided on the prism sheet. The light therefore looks as if distributed widely, as viewed through the prism sheet.

Prisms, each having a cross section having straight sides, may be formed on a light guide. In this case, the light introduced into the light guide will diverge with anisotropy toward a particular direction. Consequently, luminance non-uniformity will develop, in the form of such slant bright lines as shown in FIG. 28. Further, as shown in FIG. 29, the light beams emitted from the spot light sources overlap one another, increasing the luminance at a part where two adjacent beams overlap. This also results in luminance non-uniformity.

To eliminate dark regions between the primary light sources or at the corners, the light-incoming end face may be roughened as described above. In this case, the dark regions indeed become small. However, more prominent luminance non-uniformity develops in the form of such slant bright lines as shown in FIG. 30.

In order to eliminate such luminance non-uniformity, it is proposed that the surface of prisms formed on the light guide be roughened or the linear shape of the prisms be changed, as disclosed in JP-2004-6326-A (Patent Document 6). Even in any surface light source device using such a light guide, however, dark regions may develop in front of the spot light sources based on that the luminance increases at the positions where the light beams emitted from the spot light sources overlap one another as shown in FIG. 29. This depends on the size of the device, the number of spot light sources (e.g., LEDs) arranged, or the distance between the spot light sources.

Patent Document 1: JP-7-270624-A
Patent Document 2: JP-7-27137-B
Patent Document 3: JP-9-160035-A
Patent Document 4: JP-5-6401-U
Patent Document 5: JP-8-179322-A
Patent Document 6: JP-2004-6326-A

DISCLOSURE OF THE INVENTION

Object to be Achieved by the Invention

An object of the present invention is to provide a high-quality surface light source device that can eliminate various types of luminance non-uniformity that may develop if a small number of spot light sources are used in order to reduce power consumption, and a light guide for use in the surface light source device.

Means for Achieving the Object

A light guide according to this invention is designed for use in surface light source devices. The light guide is shaped like a plate, designed to guide light emitted from a plurality of spot-like primary light sources and has a light-incoming end face for receiving the light from the primary light sources and a light-outgoing face for emitting the light guided in the light guide. The light guide is characterized in that a high light diffusion region is formed on at least one of the light-outgoing face and a rear surface opposite to the light-outgoing face, disposed in the vicinity of the light-incoming end face so as to extend substantially in a direction of the directivity of the light introduced into the light guide within a plane extending along the light-outgoing face, and has a larger average inclination angle than that of all adjacent region thereof.

A surface light source device according to this invention includes the above-mentioned light guide; the above-mentioned plurality of spot-like primary light sources arranged near the light-incoming end face of the light guide; and an optical deflection element arranged adjacent to the light-outgoing face of the light guide, which has a light-incidence surface opposed to the light-outgoing face of the light guide, a light-emitting surface opposed to the light-incidence surface, and a plurality of elongated lenses formed on the light-incidence surface so as to extend substantially in parallel to the light-incoming end face of the light guide and in parallel to one another.

EFFECT OF THE INVENTION

The present invention can provide a high-quality surface light source device that can eliminate various types of luminance non-uniformity that may develop if a small number of spot-like primary light sources are used in order to reduce power consumption. Particularly, the present invention can provide a surface light source device that is fit for use in relatively small liquid crystal display devices fit for use as display panels in portable electronic apparatuses such as cellular telephones and portable game apparatuses, or as indicators in various apparatuses.

BRIEF DESCRIPTION OF DRAWINGS

FIG. 2 is a bottom view showing the light guide according to the present invention, together with primary light sources;

FIG. 3 is a diagram illustrating how an optical deflection element deflects light;

FIGS. 10A and 10B are bottom views each showing a light guide according to the present invention, together with primary light sources;

FIG. 11 is a schematic plan view explaining a method of measuring the normal-luminance distribution in a surface light source device according to the present invention;

EXPLANATION OF REFERENCE SYMBOLS

Figure 1:
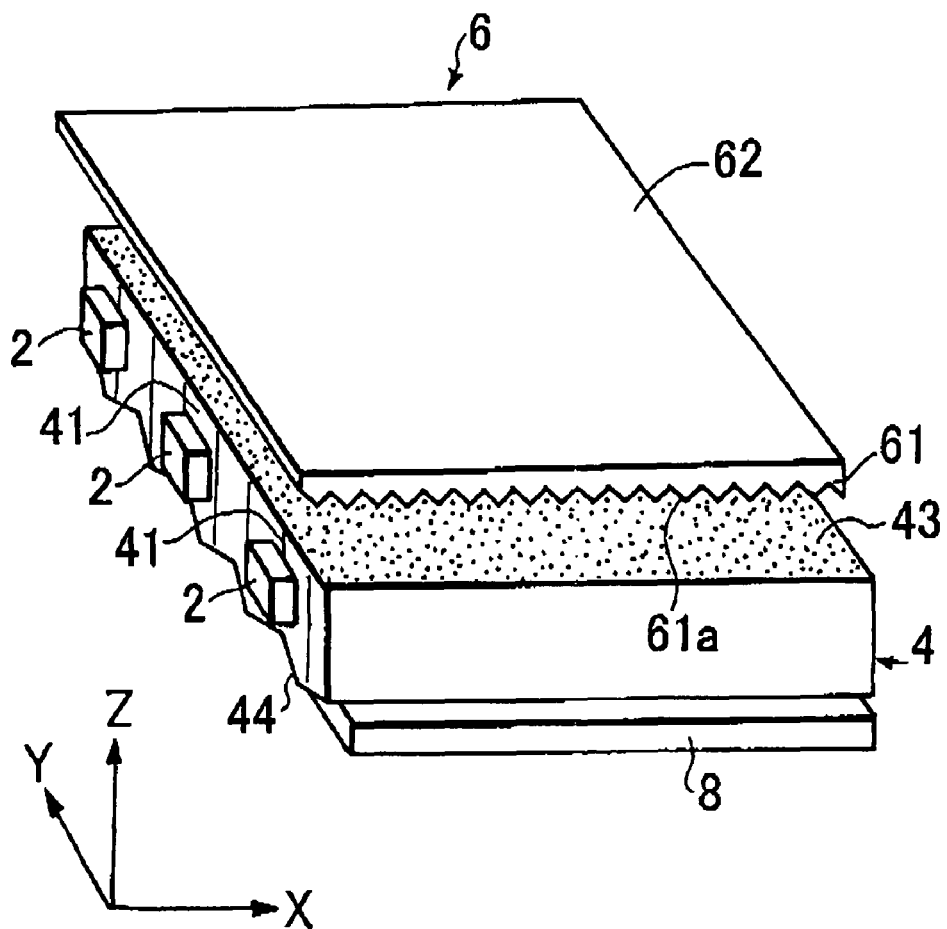
FIG. 1 is an exploded perspective view showing a surface light source device according to the present invention.

2 LED
4 Light guide
41 Light-incoming end face
43 light-outgoing face
431 High light diffusion region
432 First region
433 Second region
434 Third region
435 Smooth region
44 Elongated lens formed surface
44*a* Elongated lens
6 Light deflection element
61 Light-incidence surface
61*a* Elongated lens
62 Light-emitting surface
8 Light reflection element
50 Slant elongated lens
52 Dot pattern

BEST MODE FOR CARRYING OUT THE INVENTION

Embodiments of the present invention will be described, with reference to the accompanying drawings.

FIG. 1 is an exploded perspective view showing an embodiment of a surface light source device according to the present invention. As shown in FIG. 1, the surface light source device according to this embodiment includes a plurality of LEDs 2, a light guide 4, a light deflection element 6, and a light reflection element 8. The LEDs 2 are used as spot-like primary light sources. The light guide 4 is shaped like a rectangular plate, lies in an XY plane, receives the light from the LEDs 2 at a light-incoming end face, and emits the light from the light-outgoing face. The light deflection element 6 and the light reflection element 8 are arranged adjacent to the light guide. The light guide 4 has two major surfaces and four sides that connect the edges of one major surface to those of the other major surface.

The LEDs 2 are juxtaposed on one of two opposing, substantially parallel sides of the light guide 4 (i.e., light incident side, or the left side in FIG. 1), and are spaced apart in the Y-axis direction by an appropriate distance. One of the LEDs lies between the two others. In the present invention, the spot-like light sources, i.e., LEDs, which are the primary light sources, should better be used in as small a number as possible in order to reduce the power consumption. Nevertheless, many spot-like light sources may be arranged at regular intervals or adjacent to one another, depending on the size of the light guide 4.

The light guide 4 has light-incoming end faces 41 at its light-incident side. The light-incoming end faces 41 of the light guide 4 may be, for example, concave surf aces which have been formed by cutting the light-incident side. Preferably, the light-emitting surface of each LED is convex so that it may well fit in a light-incoming end face of the light guide. The light-emitting surface of each LED and the corresponding light-incoming end face of the light guide may be flat.

It is desirable to roughen the light-incoming end faces 41 so that the light may greatly diverge in the XY plane. The faces 41 may be roughened by various methods, including cutting by use of a milling cutter, polishing using a grinding stone, sandpaper, buff or the like, blast process, electric discharge machining, electropolishing, chemical polishing, and the like. Blast particles used in the blast process may be spherical ones such as glass beads or polyhedral ones such as alumina beads. Polyhedral particles are preferred because they can serve to form rough surfaces that make light diverge greatly. The direction of processing, such as cutting or polishing, may be adjusted, thereby to form anisotropic rough surfaces. The process of forming rough surfaces may be performed directly on the light-incoming end faces of the light guide. Alternatively, a mold having rough surfaces processed complementarily to the rough light-incoming end faces may be used to form the light-incoming end faces on the side of the light guide.

One major surface of the light guide 4 (i.e., upper surface in FIG. 1) is the light-outgoing face 43. The light-outgoing face 43 has a directional light-emitting mechanism that emits light from the light guide 4 in a direction inclined relative to the light-outgoing face 43 (that is, to the XY plane). The directional light-emitting mechanism comprises a rough surface (e.g., mat surface) or uneven structure formed surface (projections/depressions formed surface). The directional light-emitting mechanism emits light that propagates in a certain direction in the XZ plane defined by a normal to the light-outgoing face 43 (the Z-axis direction) and the X-axis direction perpendicular to the light-incoming end side. The direction of peak emission in the distribution inclines at angle of, for example, 10° to 40° relative to the light-outgoing face 43. The distribution of light emitted therefore has a half-width value of, for example, 10° to 40°. The directional light-emitting mechanism will be later described in detail.

The other major surface of the light guide 4 (i.e., rear surface: lower surface in FIG. 1) is an elongated lens formed surface 44, which is an elongated structure formed surface. The elongated lens formed surface 44 has a plurality of elongated lenses as the elongated structure. The elongated lenses are arranged in parallel to one another, extending almost in the direction of the directivity of the light (i.e., the direction in which the light has a peak in the light-intensity distribution), in the plane (i.e., XY plane) that is parallel to the light-outgoing face 43, emitted from the LEDs 2 and introduced into the light guide 4. Hereinafter, the term "directivity of the light introduced into the light guide 4" means a direction in the plane parallel to the light-outgoing face 43 (i.e. the XY plane), unless otherwise specifier. The directivity of the light introduced into the light guide 4 may be substantially the X-axis direction. In this case, the direction in which the elongated lenses 44a extend can be the X-axis direction as shown in FIG. 2. (FIG. 2 shows the edges of the elongated lenses 44a.) In the present invention, the direction in which the elongated lenses 44a extend may deviate from the directivity of the light introduced into the light guide 4 unless it impairs the diversion of light. Such a direction is regarded as almost identical to the directivity of the light introduced into the light guide 4. In this case, the elongated lenses 44a should extend at an angle of 20° or less, preferably 10° or less, relative to the direction of the directivity of the light introduced into the light guide 4. Since the elongated lenses extend so, the light introduced into the light guide diverges in the XY plane. Thus, dark regions will scarcely develop.

The light deflection element 6 is arranged on the light-outgoing face 43 of the light guide 4. Each of the two major surfaces of the light deflection element 6 is, as a whole, parallel to the XY plane. One major surface (i.e., the major surface facing the light-outgoing face 43 of the light guide 4) is a light-incidence surface 61. The other major surface is a light-emitting surface 62. The light-emitting surface 62 is flat, extending in parallel to the light-outgoing face 43 of the light guide 4. The light-incidence surface 61 is an elongated lens formed surface, on which a number of elongated lenses 61a are arranged in parallel to one another. The elongated lenses 61a on the light-incidence surface 61 extend in parallel to one another and almost at right angles to the direction of the directivity of the light introduced from the LEDs 2 into the light guide 4. The elongated lenses 61a extend in the Y-axis direction in the present embodiment.

FIG. 3 shows how the an light deflection element 6 deflects light. This figure shows the direction in which the peak-emission light (i.e., the light at a peak in the distribution of light emitted) propagates in the XZ plane from the light guide 4. The light emitted slantwise from the light-outgoing face 43 of the light guide 4 is incident on the first surface of each elongated lens 61a and then totally reflected at the second surface of the elongated lens. The light so reflected is emitted in a direction that is substantially normal to the light-emitting surface 62. In the YZ plane, the luminance in the direction normal to the light-emitting surface 62 can be sufficiently enhanced over a broad region, thanks to the action of the elongated lenses 44a.

Figure 4:
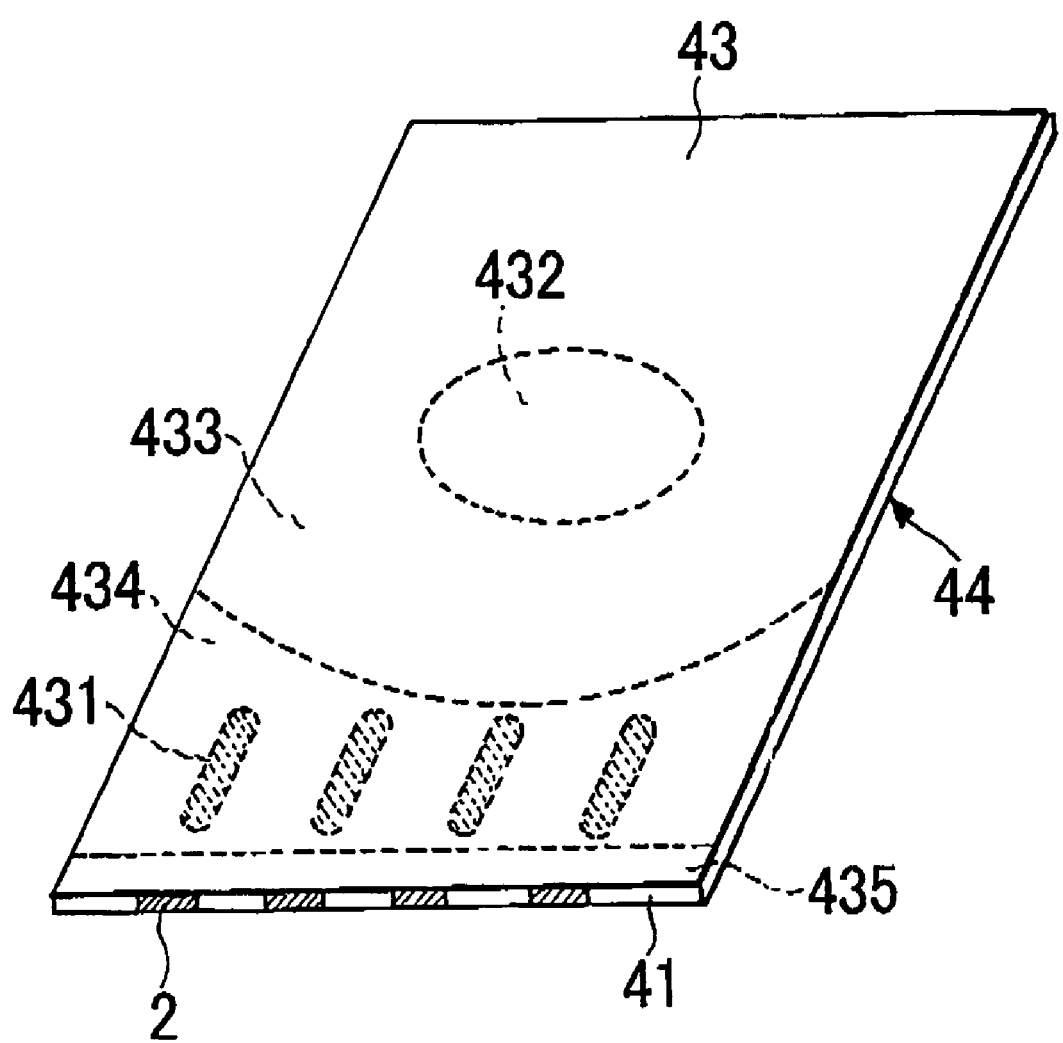
FIG. 4 is a perspective view showing the light guide according to the present invention, together with primary light sources.

FIG. 4 is a perspective view showing the light guide 4, together with the LEDs 2. This figure particularly illustrates the configuration of the light-outgoing face 43 of the light guide 4. With reference to the figure, the directional light-emitting mechanism will be described hereunder in detail. The LEDs 2 (four LEDs in this embodiment) opposed to the flat light-incoming end faces 41 are arranged at substantially regular intervals. The direction of directivity, in the light guide 4, of the light beam emitted from each LED 2 and incident on the light-incoming end faces 41 is almost perpendicular to the light-incoming end faces 41. The direction of directivity is identical with the X-axis direction shown in FIG. 1 in most cases.

The light-emitting mechanism that the light-outgoing face 43 has may be a rough surface or a surface having uneven structures such as projections and depressions, as described above. The surface may have a number of dots or conical projections. Alternatively, the surface may be an elongated lens formed surface that have a number of elongated lenses such as elongated prisms, elongated lenticular lenses or V-grooves that extend substantially in perpendicular (Y-axis direction shown in FIG. 1) or substantially in parallel (X-axis direction shown in FIG. 1) to the direction of directivity of the light introduced into the light guide 4. The elongated lenses are not limited to straight ones. They may be curved, surrounding the LEDs 2 (for example, arcuate ones concentrically surrounding LED 2).

The rough surface or the surface having uneven structures, which constitute the light-emitting mechanism, should have an average inclination angle θa falling within the range of 0.2 to 20° as measured by the method prescribed in ISO4287/1-1934 along the direction of directivity of the light introduced into the light guide, in order to render the luminance uniform in the light-outgoing face 43. Preferably, the average inclination angle θa should range from 0.3 to 10°. More preferably, it should range from 0.5 to 5°.

If the elongated lens formed surface having elongated lenses extending in the Y-axis direction is used as light-emitting mechanism, the elongated lenses should be arranged at pitch of 10 to 100 μm, preferably 10 to 80 μm, and more preferably 20 to 60 μm. In this case, the apex angle of the elongated lens should range from 140° to 179.6°, preferably from 156° to 179.4°, and more preferably from 164° to 179°.

The average inclination angle θa of the rough surface or the surface having uneven structures such as an elongated lens formed surface, which constitute the light-emitting mechanism in the light guide 4, can be measured by determining the shape of the rough surface, etc. with a contact-stylus, surface-roughness meter as prescribed in ISO4287/1-1984 and then applying the inclination function f(x) (x: position in the measuring direction) to the following equations (1) and (2).

$$\Delta a = (1/L) \int_o^L |(d/dx) f(x)| dx \quad (1)$$

$$\theta a = \tan^{-1}(\Delta a) \quad (2)$$

where L is the length over which the measuring is performed, and Δa is the tangent of the average inclination angle θa.

The light-emitting mechanism in the light guide may have substance having a refractive index different from that of the main component of the light guide. The substance having such a refractive index may be dispersed in the light guide, in the form of fine particles. Alternatively, a layer having a different refractive index may be provided on a surface of the light guide or in the light guide. This substance should have a refractive index that differs by 0.002 to 0.3 from that of the main component of the light guide, preferably by 0.005 to 0.2, and more preferably by 0.01 to 0.1. The substance different in refractive index should better be fine particles, which can readily dispersed and can therefore facilitate the manufacture of the light guide. Silicon particles, styrene particles, particles of copolymer thereof, acryl particles, particles of copolymer thereof, inorganic particles, and the like can be exemplified as the fine particles. The concentration at which the fine particles are used should be 0.01 wt % to 10 wt %, preferably 0.1 wt % to 5 wt %, and more preferably 0.2 wt % to 3 wt %.

To enable the surface light source device to acquire high luminance, it is desired that the light-emitting mechanism should not be provided on the region 435 of the light-outgoing face 43, which lies adjacent to the light-incoming end face 41 and which extends along the light-incoming end face 41. The smooth region 435, on which the light-emitting mechanism is not provided and has an average inclination angle of substantially 0°, should better have a width of 7 mm or less, preferably 5 mm or less, and more preferably 4 mm or less.

The light-emitting mechanism can suppress luminance non-uniformity and optimize the luminance distribution in the light-outgoing face 43 if it is so arranged that the light is not uniformly diffused in the light-outgoing face 43 of the light guide 4. The average inclination angle of the light-emitting mechanism of the light guide may be increased or decreased for a region where the normal luminance decreases or increases, respectively, when measured after the light deflection element, light reflection element and the primary light sources have been arranged if the light-emitting mechanism assumes a uniform state in the entire effective light-emission region. Then, the luminance non-uniformity can be reduced.

In such a surface light source device as the device according to this invention, particularly a small surface light source device, it is desired that the luminance on the light-emitting surface be high at the center, gradually decreasing toward the edges. Thus, it is preferable that the center of the light-outgoing face 43 has a large average inclination angle and the other areas each have a region having smaller average inclination angle. In this embodiment, a circular region 432 having a large average inclination angle is formed at the center of the light-outgoing face 43, a region 433 having a relatively large average inclination angle is formed, surrounding the region 432, a region 434 having a small average inclination angle is formed, closer to the light-incoming end faces 41 than the region 433 is, and the above-mentioned smooth region 435 is formed between the region 434 and the light-incoming end faces 41. The regions 432, 433 and 434 constitute the light-emitting mechanism. The region 434 of a small average inclination angle has an average inclination angle $\theta a$ of 0.2 to 2°, preferably 0.5 to 1.5°. The region 433 of a relatively large average inclination angle has an average inclination angle $\theta a$ of 1 to 10°, preferably 1.5 to 5°. The region 432 of a large average inclination angle has an average inclination angle $\theta a$ of 1.5 to 20°, preferably 2 to 10°. These regions should better be formed in such a manner that their average inclination singles $\theta a$ gradually change at the boundaries thereof in order to avoid the quality degradation such as great luminance changes resulting from sharp changes in light diffusion.

Moreover, in this embodiment, high light diffusion regions 431 are formed on the light-outgoing face 43 of the light guide 4. These regions 431 lie near the light-incoming end faces 41 and in front of the LEDs 2, respectively. They extend straight in the direction of the directivity of the light introduced from the LEDs 2 into the light guide 4 (in most cases, extending in the X-axis direction shown in FIG. 1). The high light diffusion regions 431 are provided in the region 434 having a small average inclination angle. They have a larger average inclination angle than the region surrounding them, i.e., the region 434. Therefore, the high light diffusion regions 431 have a higher light diffusion than that of the region 434. The high light diffusion regions 431 constitute a light-emitting mechanism, too. The high light diffusion regions 431 are formed to prevent relatively dark regions from developing in front of the LEDs 2 due to the fact that the luminance becomes high as the positions where the light beams emitted from the LEDs 2 overlap one another. The difference in average inclination angle $\theta a$ between each high light diffusion region 431 and the region 434 should be 0.1 to 1°. If the difference is less than 0.1°, it may not be possible to prevent dark regions from developing in front of the LEDs 2. If the difference exceeds 1°, the high light diffusion region 431 may be too bright, inevitably causing luminance non-uniformity. Preferably, the difference in average inclination angle $\theta a$ between each high light diffusion region 431 and the region 434 is 0.3 to 0.7°, and more preferably 0.2 to 0.4°. It is desired that the high light diffusion regions 431 be so formed that the average inclination angle $\theta a$ gradually changes at the boundaries with the surrounding region, in order to avoid the quality degradation such as great luminance changes resulting from sharp changes in light diffusion with respect to the region 434.

The high light diffusion regions 431 are elongated, either rectangular or triangular, extending substantially in the direction of the directivity of the light introduced into the light guide 4. They should preferably have rounded corners or be shaped like an elongated circle, in order to avoid the quality degradation such as great luminance changes resulting from sharp changes in light diffusion with respect to the surrounding region. Thus, as shown in FIG. 4, the high light diffusion regions 431 are shaped like a rectangle with rounded corners or like an elongated circle. The high light diffusion regions 431 may have a width and a length, which accord with dark regions to develop. To prevent dark regions from developing in front of the LEDs 2, the regions 431 preferably have a width of 0.5 to 5 mm and a length of 0.55 to 35 mm so that they may not be too bright and may have an aspect ratio of 1.1 to 7. The aspect ratio is a ratio of the minor axis (extending substantially at right angles to the direction of the directivity of the light introduced into the light guide 4) to the major axis (extending in the direction of the directivity of the light introduced into the light guide 4). Preferably, the aspect ratio ranges from 3 to 5, the width ranges from 1.5 to 4.5 mm, and the length ranges from 5 to 15 mm.

The positions where the high light diffusion regions 431 are formed can be selected in accordance with the dark regions to develop. In order not to become too bright and to prevent dark regions from developing in front of the LEDs 2, the high light diffusion regions 431 should be positioned, with one end located at a distance of 0.5 to 7 mm from the corresponding light-incoming end face 41 and outside the effective light-emitting region.

In the present invention, to prevent luminance non-uniformity from developing, it is desirable that art uneven structure or projection-depression structure such as the elongated lenses 44a formed on the light guide 4 should have an appropriate sectional shape. The appropriate shape is determined on the basis of an inclination angle (minute inclination angle) and a ratio (distribution) of angle components. The inclination angle pertains to a minute region or segment that is required, as described below, to define the cross section of the elongated uneven structure such as elongated lens. The ratio of angle components is based on the number of the segments having certain inclination angle or certain range of the inclination angle.

Figure 5A:
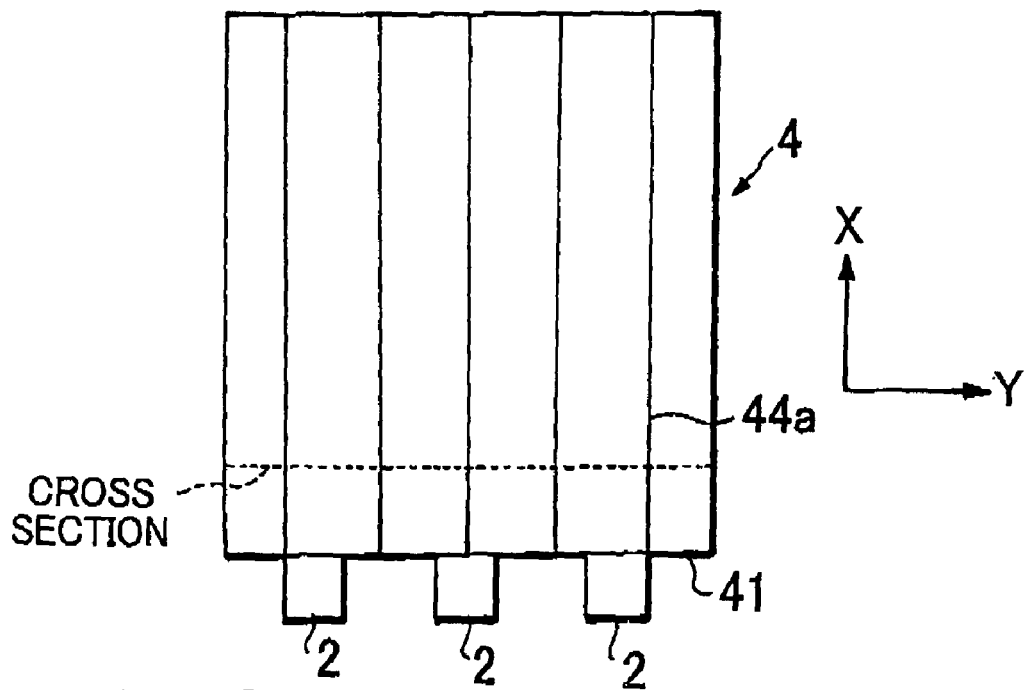
FIGS. 5A and 5B are bottom views each showing the light guide according to the present invention, together with primary light sources.
Figure 5B:
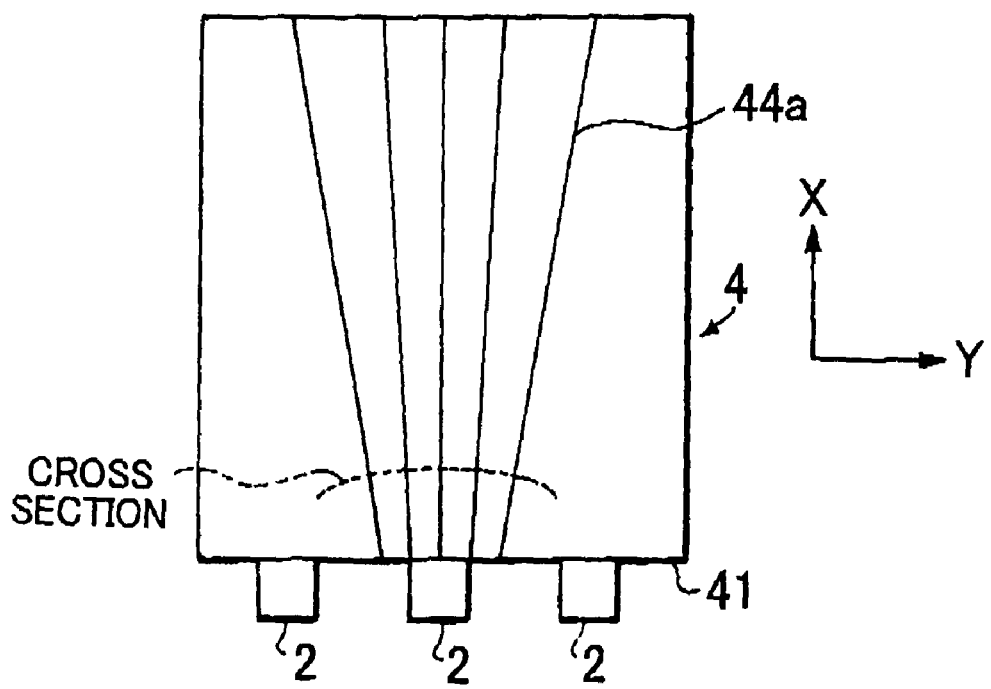

A cross section (see FIG. 5A) that is substantially perpendicular to the direction in which the elongated uneven structure, e.g., elongated lens 44a, extends is used as the basis of calculating the minute inclination angle and the distribution of angle components. The elongated uneven structures, such as elongated lens 44a, may not be completely parallel to one another. In this case, a curved cross section that intersects at right angles with the direction in which the individual elongated uneven structure (e.g., elongated lens) extends is employed (see FIG. 5B).

Figure 6A:
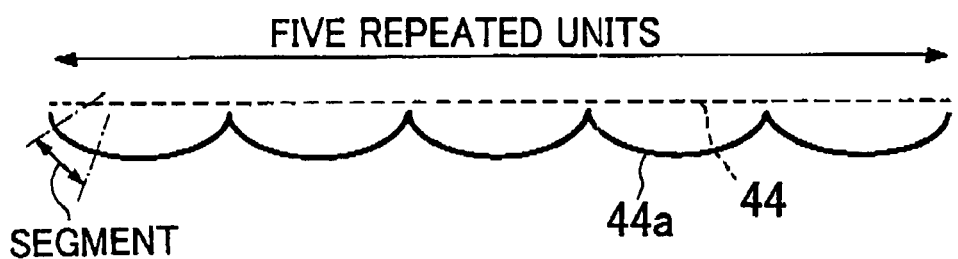
FIGS. 6A and 6B are diagrams each explaining a method of calculating a distribution of inclination angles, which is used to determine the sectional shape of the elongated lens provided on a light guide according to the present invention.

As shown in FIG. 6A, five repeated units of the elongated lens 44a are extracted from the cross section of elongated lens formed surface. The five repeated units are divided into 500 segments, along the line in which the elongated lenses ale juxtaposed. Thus, each repeated unit is divided into 100 segment. The number of repeated units of the cross section, which are to be extracted, is not limited to five. The number of segments, into which the repeated units are divided, is not limited to 500. They can be changed so long as the minute inclination angle and the distribution of angle components, both selected, are appropriate for the entire cross section.

Figure 6B:
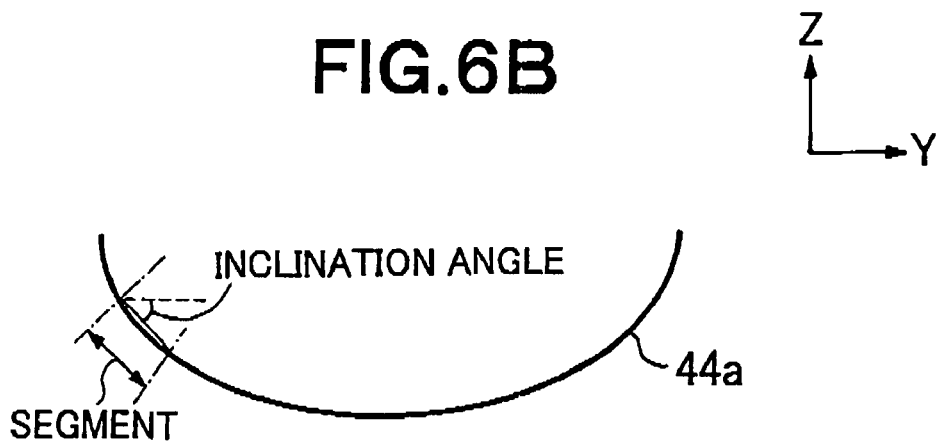
Figure 7:
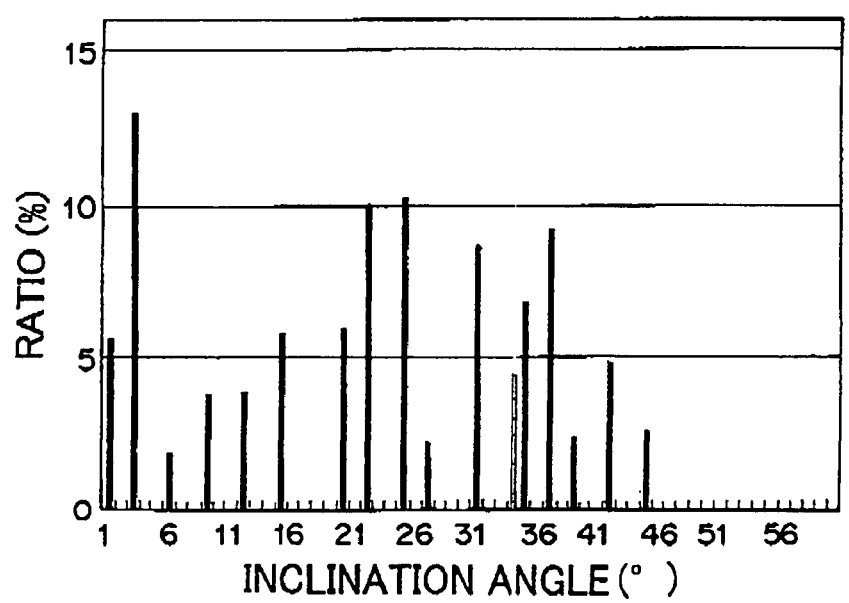
FIG. 7 is a graph showing an example of the distribution of inclination angles.

As shown in FIG. 6B, the absolute value of the angle (inclination angle) defined by the tangent of each segment and the plane in which the elongated uneven structure formed surface such as the elongated lens formed surface 44 lies is obtained first. The tangent is, for example, one at the center of the segment and can approximately a line that connects the ends of the segment as shown in FIG. 6B, and the above plane is level one independent of the actual elongated uneven structures such as elongated lenses. Then, a frequency distribution of the absolute values of inclination angles for all segments (i.e., ratio of the number of segments having each inclination angle component to the number of all the segments) is determined for every 1° (this angle $\alpha°$ represents a range of $\alpha°-0.5°$ or more while less than $\alpha°+0.5°$.) FIG. 7 shows an example of the frequency distribution of angle components.

Then, the ratio of the number of segments having angles falling within a specific range relative to the number of all the segments is obtained. This ratio is used as ratio of the angle components falling within that specific range. From the ratio of the angle components, the shape of the elongated uneven structures such as elongated lenses is determined. Assume that the ratio of the number of segments falling within 20 to 50° of the angle range relative to the number of all the segments is 35% in the case shown in FIG. 7. Then, the ratio of the angle components falling within 20 to 50° of the angle range is regarded as being 35%.

Figure 8:
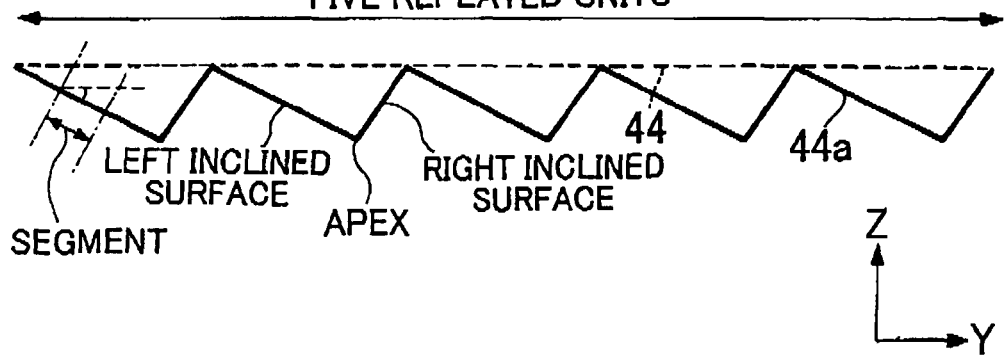
FIG. 8 is a diagram explaining a method of calculating a distribution of inclination angles, which is used to determine the sectional shape of the asymmetrical elongated lens provided on a light guide according to the present invention.

As shown in FIG. 8, the left and right halves of every repeated unit of the cross section may be asymmetrical to each other. In this case, five repeated units are extracted. The left half of each unit is divided into 50 segments along the line, of the cross section, thus obtaining 250 segments in total. Similarly, the right halt of each unit is divided into 50 segments along the line of the cross section, thus obtaining 250 segments in total. For each segment of the left half, the absolute value of the angle (inclination angle) defined by the tangent of the segment and the plane in which the elongated uneven structure formed surface such as elongated lens formed surface 44 lies is then obtained. Next, a frequency distribution of the absolute values of inclination angles for all the segments of any left half of the unit is determined for every 1°. Similarly, a frequency distribution of the absolute values of inclination angles for all the segments of any right half of the unit is determined for every 1°. The number of repeated units, which are to extract, is not limited to five. Likewise, the number of segments into which each unit is divided is not limited to the value specified above. They can be changed so long as the minute inclination angle and the frequency distribution, both selected, are appropriate for the entire cross section.

Figure 9:
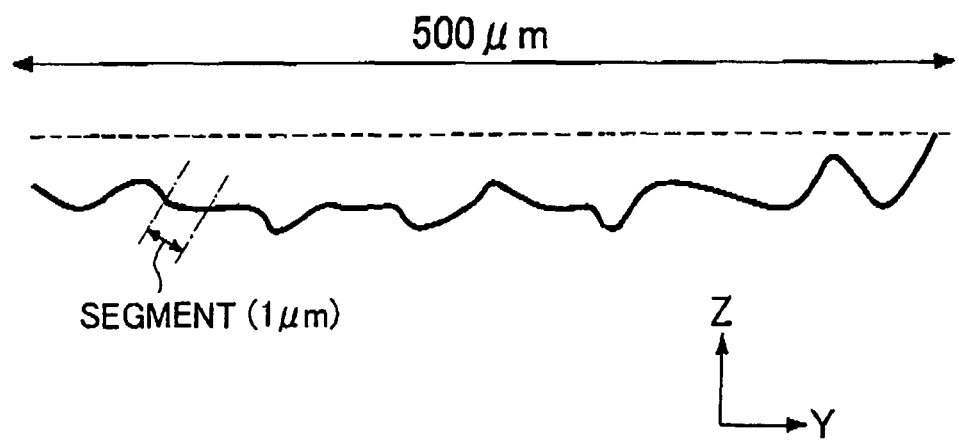
FIG. 9 is a diagram explaining a method of calculating a distribution of inclination angles, which is used to determine an irregular sectional shape of elongated uneven structures provided on a light guide according to the present invention.

The cross section of the elongated uneven structures may not be a simple one that consists of repeated identical units. Rather, it may be such an irregular one as illustrated in FIG. 9. If this is the case, a part of the cross section, which is 500 μm long along the line of the cross section, is extracted and divided along the line of the cross section into 500 segments, each 1 μm long. Then, a frequency distribution for all the segments thus obtained is calculated in the same way as described above. The length of the part of the cross section, which is extracted, is not limited to 500 μm. The number of segments, into which this part of the cross section is divided, is not limited to 500. They can be changed so long as the minute inclination angle and the distribution frequency, both selected, are appropriate for the entire cross section.

In the present invention, the shape of the valleys (the lowest parts and the vicinity thereof in the cross section) at the boundaries of the repeated units influences the optical performance of the device most if the cross section has a regular shape that consists of identical repeated units (that is, if the elongated uneven structures are elongated lenses). Hence, the inclination angle of the valleys of the elongated lenses is used to evaluate the optical performance of the device. The inclination angle is measured as follows. As mentioned above, five repeated units, for example, are extracted from the cross section of the elongated lens formed surface. The five repeated units are divided into 500 segments along the line of the cross section. Thus, each repeated unit is divided into 100 segments. Then, five valleys at the boundaries between the repeated units are examined, obtaining a first average values of the inclination angles for six segments on the left side of each boundary and for six segments on the right side of the boundary. If the left and right halves of each repeated unit are symmetrical to each other, a second average value of the inclination angles of the above ten first average values is regarded as the inclination angle of the valley of the elongated lenses. The left and right halves of each repeated unit may be asymmetrical to each other. In this case, a third average value of the inclination angles of the above five first average values regarding the left halves is regarded as the inclination angle of the left side of the valley of the elongated lenses, while a fourth average value of the inclination angles of the above five first average values regarding the right halves is regarded as the inclination angle of the right side of the valley of the elongated lenses.

Figure 27:
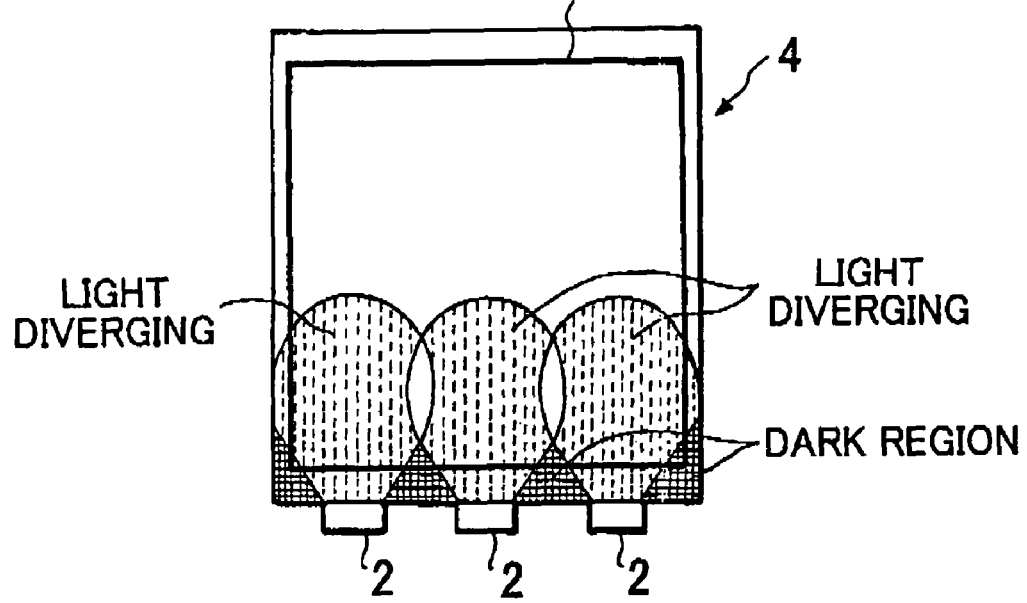
FIG. 27 is a schematic diagram explaining how luminance non-uniformity develops in a surface light source device.

Luminance non-uniformity that results in such dark regions as shown in FIG. 27 may be observed in the effective light-emitting region if the primary light sources are spiced at long intervals from one another and the effective light-emitting region is close to the light-incoming end face. To attenuate such luminance non-uniformity, the light introduced into the light guide must be sufficiently diverged in the XY plane near the primary light sources, that is, in the vicinity of the light-incoming end face, so that the light can be observed in a broad region through thus light deflection element 6. In view of this, at least a part of each elongated lens 44a which is located near the primary light sources, that is, in the vicinity of the light-incoming end face, is so shaped to make the light diverge well. As indicated above, the light introduced into the light guide is reflected by the elongated lenses 44a and travels in the XY plane, propagating slantwise to the direction of the directivity of the light introduced into the light guide. The elongated lenses 44a reflect this light, guiding the same again in the direction of the directivity of the light. As a result, the light introduced into the light guide diverges in the XY plane and yet travels in a direction almost perpendicular to the elongated lenses 61a of the light deflection element 6. The light therefore is observed diverging as viewed through the light deflection element 6 along a normal to the light-outgoing face.

To enhance the function of diverging light, it is desired that, in the cross section of the elongated uneven structures such as elongated lenses 44a, the angle components of 20 to 50° should exist in a ratio equal to or greater than a specific value. To make the light diverge more, angle components of 25 to 50° should exist in a ratio equal to or greater than a specific value. To make the light diverge even more, angle components of 30 to 50° should exist in a ratio equal to or greater than a specific value. To make the light diverge still further, angle components of 35 to 50° should exist in a ratio equal to or greater than a specific value. To make the light diverge still more, angle components of 40 to 50° should exist in a ratio equal to or greater than a specific value. The higher the ratio is, the better to enhance this function.

The term "cross section" of the elongated uneven structures such as elongated lenses 44a means an average shape for the elongated uneven structures extracted in the process of calculating the above-mentioned parameters. If the cross section is such an irregular one as described above, this term means an averaged shape, regardless of the sectional shape of the individual elongated uneven structure. If the left and right halves of each repeated unit are asymmetrical to each other, the term means the shape of either half. The following description is based on the assumption that the elongated uneven structures are elongated lenses and that the left and right halves of each repeated unit are symmetrical to each other. Nonetheless, the term has the same meaning for any other case.

To make the light diverge as desired, it is desired that, in the cross section of the elongated lenses 44a near the primary light sources (that is, in the vicinity of the light-incoming end face), angle components of 20 to 50° should exist in a ratio of at least 10%. Preferably, the angle components should exist in a ratio of at least 20%, and more preferably at least 30%.

To make the light diverge more, in the cross section of the elongated lenses 44a near the primary light sources (that is, in the vicinity of the light-incoming end face), angle components of 25 to 50° should exist in a ratio of at least 10%. Preferably, the angle components should exist in a ratio of at least 20%, and more preferably at least 30%.

To make the light diverge even mote, in the cross section of the elongated lenses 44a near the primary light sources (that is, in the vicinity of the light-incoming end face), angle components of 25 to 50° should exist in a ratio of at least 20%. Preferably, the angle components should exist in a ratio of at least 30%, and more preferably at least 40%. Alternatively, angle components of 30 to 50° should exist in a ratio of at least 5%, preferably at least 10%, and more preferably at least 15%.

To make the light diverge furthermore, in the cross section of the elongated lenses 44a near the primary light sources (that is, in the vicinity of the light-incoming end face), angle components of 30 to 50° should exist in a ratio of at least 10%. Preferably, the angle components should exist in a ratio of at least 20%, and more preferably at least 30%. Alternatively, angle components of 35 to 50° should exist in a ratio of at least 9%, preferably at least 10%, and more preferably at least 20%. Still alternatively, angle components of 40 to 50° should exist in it ratio of at least 2%, preferably at least 3%, and more preferably at least 5%.

In order to increase the luminance measured in the direction of the normal to the light-outgoing face, it is desired that the light propagating slantwise to the direction of the directivity of the light introduced into the light guide in a plane parallel to the light-outgoing face should be directed, as much as possible, to the direction of the above directivity. To this end, it is preferable to arrange such elongated lenses 44a as will converge the light in the direction in which the elongated lenses 44a extend, while reflecting the light and thereby changing the direction in which the light propagates.

Figure 28:
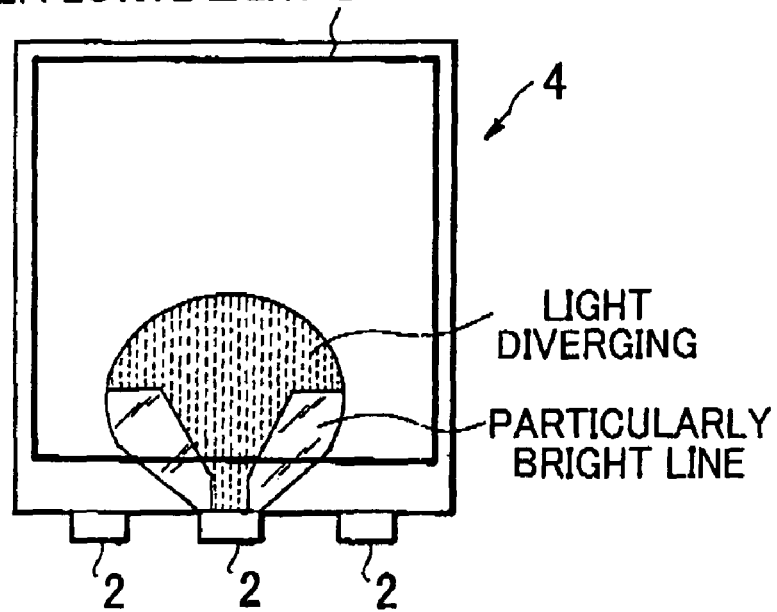
FIG. 28 is a schematic diagram explaining how luminance non-uniformity develops in another surface light source device.

In order to suppress such luminance non-uniformity as shown in FIG. 28, developing in the form of slant bright lines because the light undergoes anisotropic diversion or diverges in a particular direction at the elongated lenses 44a, it is desired that the elongated lenses 44a should have a curved cross section. More specifically, when, at least near the primary light sources, the ratio of the angle components of $\alpha°$ to $\alpha°+10°$ ($\alpha°$ being a specific angle) in the sectional shape of each elongated lens 44a is obtained for all the angles $\alpha°$ of 0 to 80°, a maximum value of the ratio of the angle components should preferably be 60% or less, preferably 50% or less, more preferably 40% or less. If the maximum value of the ratio is too large, the elongated lenses 44a will have a more linear cross section. In this case, the light will more likely diverge in the particular direction, or undergo anisotropic diversion. Consequently, luminance non-uniformity will develop in the form of such slant bright lines as illustrated in FIG. 28.

To decrease the maximum value of the ratio of angle components ranging from $\alpha°$ to $\alpha°+10°$, the cross section of each elongated lens must have many angle components. In this invention, more light beams will travel in the direction of the directivity of the light introduced into the light guide if the angle components of 35° or more increases in numbers. As a result, the luminance will increase in front of the primary light sources. In addition, any angle component of 50° or more has a small light-diverging action. Thus, it is desired that most segments of the cross section of the elongated lenses should have angle components of 60° or less, preferably 50° or less. Hence, the maximum value of the ratio of angle components ranging from $\alpha°$ to $\alpha°+10°$ should preferably 15% or more, and more preferably 20% or more.

For the reason mentioned above, the ratio of angle components of 40 to 50°, mentioned above, should be 60% or less, preferably 50% or less, and more preferably 40% or less. The ratio of angle components of 35 to 50°, mentioned above, should be 90% or less, preferably 75% or less, and more preferably 60% or less. The ratio of angle components of 30 to 50°, mentioned above, should be 80% or less.

Figure 30:
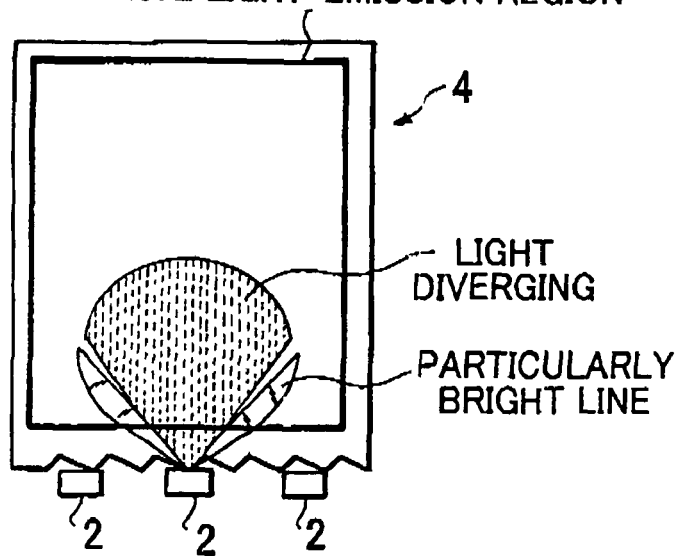
FIG. 30 is a schematic diagram explaining how luminance non-uniformity develops in still another surface light source device.

The light-incoming end face 41 will be explained. If the light-incoming end face 41 is roughened, there is obtained a greater amount of light propagating slantwise to the direction of the directivity of the light introduced into the light guide in a plane parallel to the light-outgoing face 43. The light therefore diverges more in the XY plane. Such dark regions as shown in FIG. 27 will become small. If the light much diverges, the light propagating slantwise will be reflected by the elongated lenses 44a and will likely be emitted. Consequently, such bright lines as shown in FIG. 30 may develop at the largest angles of diversion.

To prevent this luminance non-uniformity from developing in the effective light-emission region, it is effective to form elongated lenses of one structure in the region near the primary light sources and elongated lenses of another structure in the effective light-emission region. More specifically, many angle components of 30 to 50° that diverge light greatly are arranged near the primary light sources, and few angle components of 30 to 50° are arranged in the effective light-emission region. Alternatively, the valleys may have a large inclination angle near the primary light sources, and a small inclination angle in the effective light-emission region. In either case, near the primary light sources, the light diverges slantwise to the direction of the directivity of the light introduced into the light guide as it is reflected by the elongated lenses 44a, and travels while being guided back toward the direction of the directivity of the light into the light guide. As a result, the light introduced into the light guide 4 spreads in the XY plane. Moreover, more light is emitted in perpendicular to elongated prisms of a prism sheet, i.e. lens sheet used as the light deflection element 6. The light therefore looks as if spreading, as viewed through the prism sheet. The light greatly diverging, which causes luminance non-uniformity as shown in FIG. 30, is reflected by the elongated lenses 44a in the effective light-emission region, where the sectional shape of the elongated lenses 44a is different from that of the elongated lenses near the primary light sources, and never propagates in the direction of the directivity of the light introduced into the light guide. As a result, such bright lines as shown in FIG. 30 are not seen when the light is observed through the prism sheet.

To be more specific, for the purpose to prevent the boundary between the regions A and B from being observed, it is desirable, as shown in FIGS. 10A and 10B, to use a region A near the primary light sources as a region where the ratio of angle components of 30 to 50° in the elongated lens formed surface is high, and to switch this region A to a region B where the ratio of angle components of 30 to 50° is lower or the valleys have a smaller inclination angle before the region A expands into the effective light-emission region. More precisely, the region A should be switched to the region B when the region A expands to a position at least 0.1 mm, preferably at least 0.3 mm, more preferably at least 0.5 mm, before the effective light-emission region. The entire effective light-emission region may be changed to a region B as shown in FIG. 10A, or a part of the effective light-emission region may be changed to a region B as shown in FIG. 10B.

It is desired that, in the cross section of the elongated lenses 44a existing in the region B, the ratio of angle components of 30 to 50° be lower than that in the region A by at least 5%, or preferably by at least 8%. Alternatively, it is desired that, in the cross section of the elongated lenses 44a existing in the region B, the valleys have an inclination angle smaller than that in the region A by at least 5°, preferably by at least 10°, or more preferably by at least 15°. If the difference in cross section between the regions A and B is too small, such luminance non-uniformity as shown in FIG. 30 may be less prevented than otherwise.

It is desired that, in the cross section of the elongated lenses 44a existing in the region B, the ratio of angle components of 30 to 50° be at most 40%, preferably at most 30%, and at least 5%, preferably at least 10%, more preferably at least 15%. Alternatively, it is desirable that the ratio of angle zorpronents of 35 to 50° be at most 30%, preferably at most 20%, and at least 2%, preferably at least 8%, more preferably at least 13%. Still alternatively, it is desired that, in the cross section of the elongated lenses 44a existing in the region B, the valleys have an inclination angle of at most 30°, preferably at most 25°, more Preferably at most 20°, and at least 5°, preferably at least 8°, more preferably at least 10°. If the difference between the regions A and B, in the ratio of angle components or the inclination angle of the valleys, is too large, such luminance non-uniformity as shown in FIG. 30 may be less prevented than otherwise. If this difference is too small, the light diverging in a region near the primary light sources cannot be reflected to the direction perpendicular to the elongated prisms of the prism sheet. In this case, the component of light which travels along the normal to the light-outgoing face decreases in magnitude. Consequently, the luminance as measured along the normal will decrease.

It is desired that the elongated lenses 44a gradually change in shape at the boundary between the regions A and B. If the elongated lenses 44a so change in shape, the projection of the structure of the boundary into the effective light-emission region can be avoided even if the region A is switched to the region B at the edge of the effective light-emission region (i.e., the boundary between the effective light-emission region and the region corresponding to the non-display region of the liquid crystal display device).

One of the methods of changing a part of the elongated lens formed surface in shape is to roughen that part. If the elongated lens formed surface is roughened in part, the shape of the elongated lenses can be changed at least in part. The degree of this change Cay be continuously varied, thereby to change the shape of the elongated lenses gradually. Such luminance non-uniformity as shown in FIG. 29 can be eliminated by roughening the surfaces of the elongated lenses 44a.

Figure 12A:
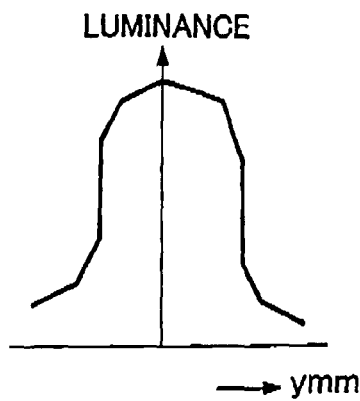
FIGS. 12A and 12B are diagrams each illustrating example of normal-luminance distribution.
Figure 12B:
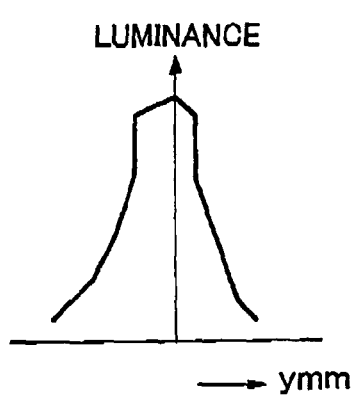
Figure 13A:
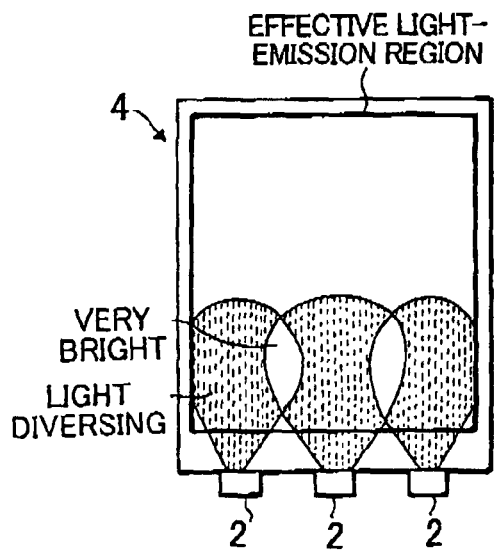
FIGS. 13A and 13B are diagrams each illustrating example of luminance distribution, which is observed when a plurality of primary light sources are used.
Figure 13B:
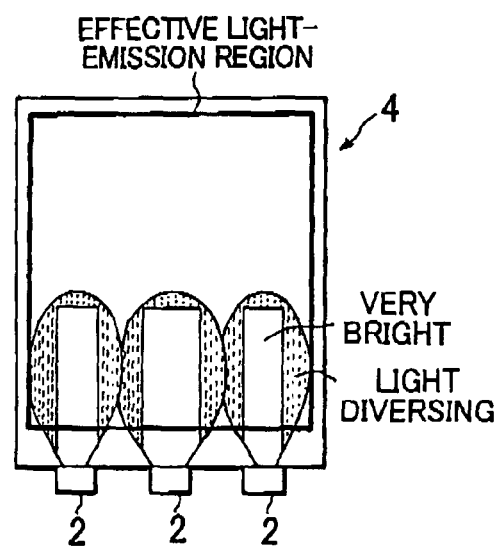
Figure 29:
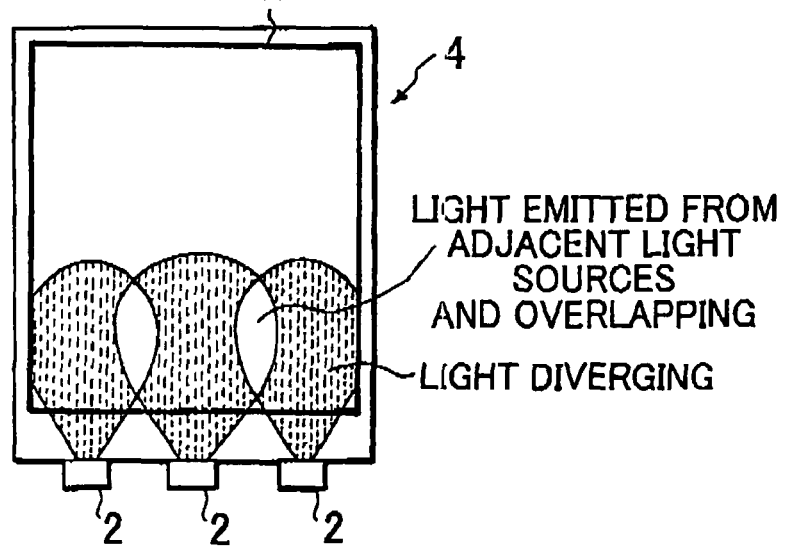
FIG. 29 is a schematic diagram explaining how luminance non-uniformity develops in a further surface light source device.

To reduce such luminance non-uniformity as shown in FIG. 29, which develops as the light beams emitted from a plurality of primary light sources overlap one another, it is desirable that the relation between the luminance distribution of the light emitted from each primary light source and the distance between the primary light sources should be made appropriate. More precisely, as shown in FIG. 11, the normal luminance is measured over a region S which is 0.5 mm wide and spaced apart by 3 to 3.5 mm from the light-incoming edge of the effective light-emission region, at intervals of 1 mm in the lengthwise direction (Y-axis direction) of the region S. Then, the normal luminance thus measured is plotted with respect to the positions y [mm] where it has been measured. In this case, it is desired that the ratio of the full width (distance) at half-maximum of the normal luminance relative to the distance between the primary light sources should fall within the range of 0.8 to 1.2, preferably 1.0. FIGS. 12A and 12B are graphs, each representing a relation between the luminance-measuring position y [mm] and the luminance. FIG. 12A shows the relation observed when the ratio is greater than 1.2. FIG. 12B shows the relation observed when the ratio is smaller than 0.8. If the ratio is too large, the light beams from any two adjacent primary light sources 2 much overlap each other and may form a bright line, ultimately forming a bright-dark pattern as shown in FIG. 13A. If the ratio is too small, the light beams from any two adjacent primary light sources 2 scarcely overlap each other and may form bright lines in front of the primary light sources and a dark line at regions corresponding to areas between the primary light sources, ultimately forming a bright-dark pattern as shown in FIG. 13B.

To provide an appropriate relation between the luminance distribution of the light emitted from each primary light source and the distance between the primary light sources, the cross-sectional shape of the elongated lenses 44a should preferably satisfy the following conditions in the vicinity of the primary light sources. That is, in the cross section, the ratio of the angle components of 35 to 60° or the ratio of the angle components of at most 15° is large in order to reduce the full width (distance) at half-maximum of the normal luminance. Conversely, in order to increase the full width (distance) at half-maximum of the normal luminance, the ratio of the angle components of 35 to 60° or the ratio of the angle components of at most 15° is small. If many angle components of 35° or more exist, the light propagating slantwise to the direction of the directivity of the light introduced into the light guide is reflected by the elongated lenses 44a and emitted at a position very close to the primary light sources. In this case, more light will travel in the direction of the directivity of the light. If many angle components of 15° or less exist, the light hardly diverges due to the elongated lenses 44a. In this case, too, more light rill travel in the direction of the directivity of the light.

More specifically, the distance between the primary light sources is 5 to 15 mm in most cases. Therefore, it is desired that, in a cross section of the elongated lenses, which satisfy the above-mentioned conditions, the ratio of the angle components of 35 to 60° should be 4 to 55%, or the ratio of the angle components of 15° or less should be 25 to 85%. The ratio of the angle components of 35 to 60° should be preferably 10 to 45%, more preferably 20 to 40%. The ratio of the angle components of 15° or less should be preferably 30 to 70%.

The positions of the regions A and B that differ in terms of the shape of the elongated lenses 44a will be described. As shown in FIG. 10A, the region A can be arranged near the primary light sources 2, and the region B can be arranged partly in the entire effective light-emission region and partly in a zone that lies between the effective light-emission region and the region A. Alternatively, as shown in FIG. 10B, the region A can be arranged near the primary light sources 2, and the region B can be arranged near the region A on a belt-like zone that extends so as to include the edge of the effective light-emission region on the side near the primary light sources 2. The part of the effective light-emission region other than the region B may have the same structure as the region A. Alternatively, such a part of the effective light-emission region may have a structure different from that of the region A. In this case, however, the elongated lenses 44a change in shape in the effective light-emission region. Hence, the shape should better be switched gradually so that the luminance non-uniformity resulting from the change in shape (i.e., switching of shale) may not conspicuous.

Figure 14:
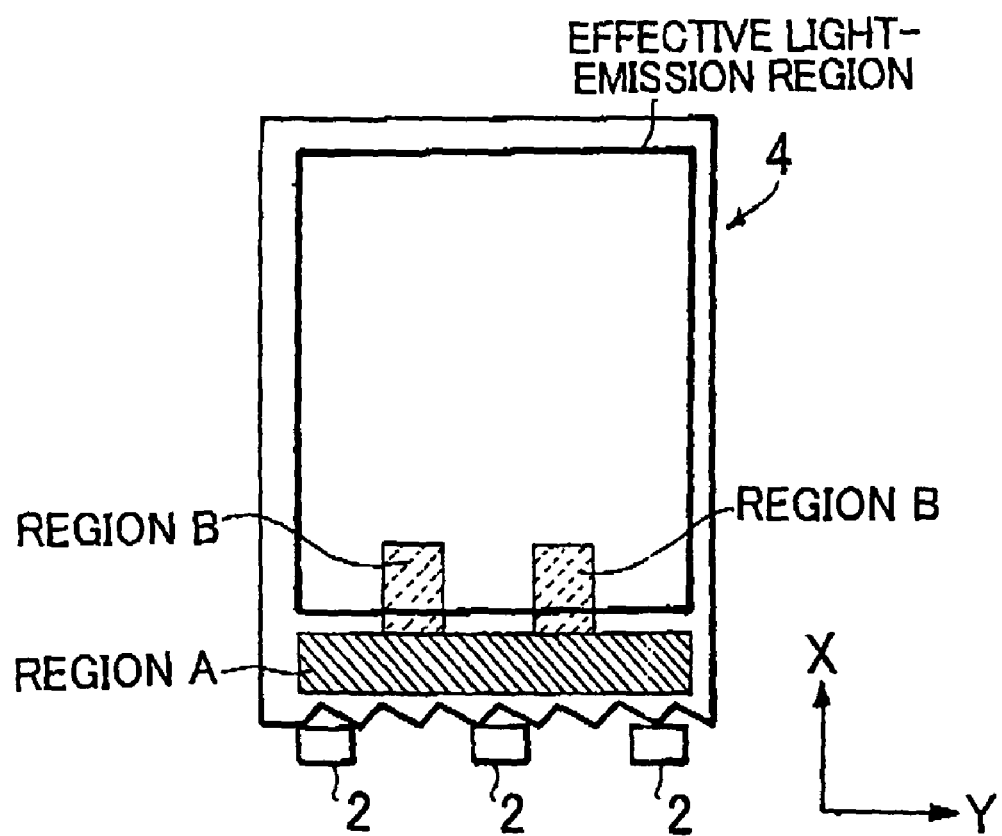
FIG. 14 is a bottom view showing a light guide according to the present invention, together with primary light sources.

It is desirable, too, to arrange island-shaped regions B as shown in FIG. 14, contacting the region A and overlapping the effective light-emission region so as to include a part of the edge of the effective light-emission region on the side near the primary light sources 2. The part of the effective light-emission region other than the regions B may have the same structure as the region A. Alternatively, such a part of the effective light-emission region may have a structure different from that of the region A. In this case, however, the elongated lenses 44a change in shape in the effective light-emission region. Therefore, the shape should better be switched gradually so that the luminance non-uniformity resulting from the change in shape (i.e., switching of shape) may not conspicuous.

Figure 15:
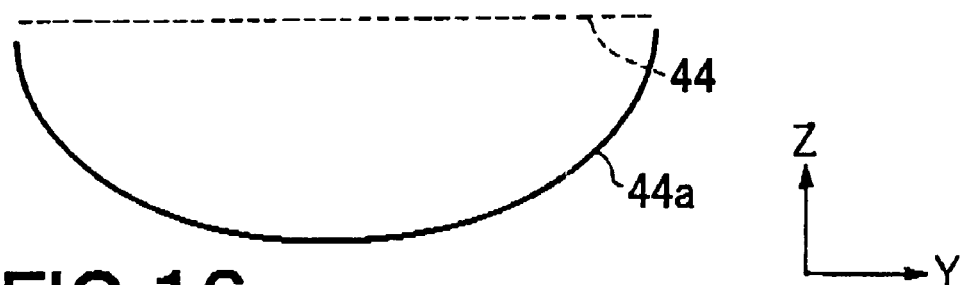
FIG. 15 is a diagram showing an example of sectional shape of the elongated lens of a light guide according to the present invention.
Figure 16:
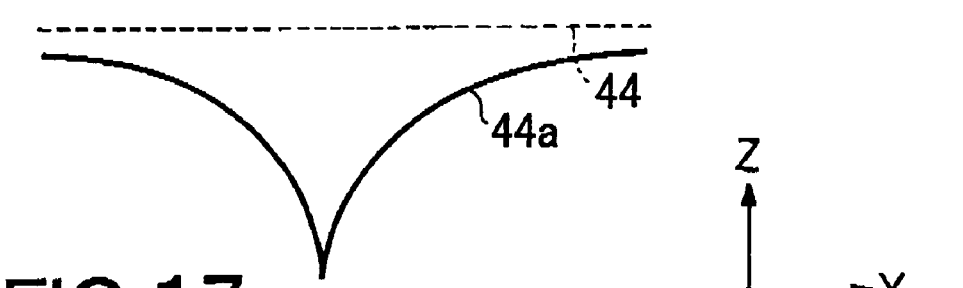
FIG. 16 is a diagram showing another example of sectional shape of the elongated lens of a light guide according to the present invention.
Figure 17:
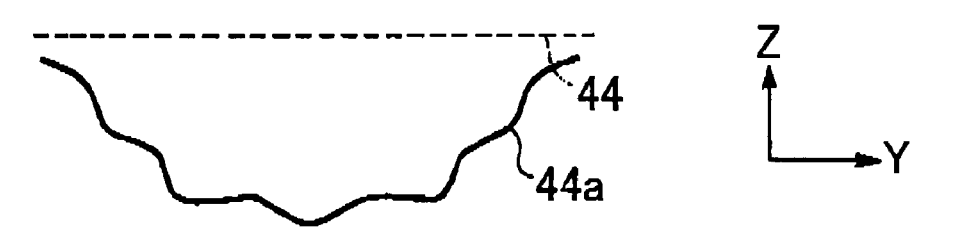
FIG. 17 is a diagram showing still another example of sectional shape of the elongated lens of a light guide according to the present invention.
Figure 18:
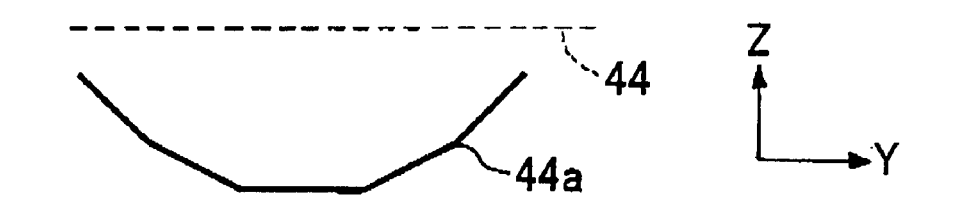
FIG. 18 is a diagram showing a further example of sectional shape of the elongated lens of a light guide according to the present invention.
Figure 19:
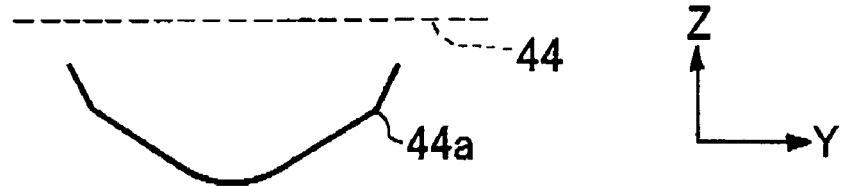
FIG. 19 is a diagram showing another example of sectional shape of the elongated lens of a light guide according to the present invention.

A preferred cross section for the elongated lenses 44a is defined by a convex curve as shown in FIG. 15. Another preferred cross section for the elongated lenses 44a is defined by concave curves as shown in FIG. 16. Still another preferred cross section for the elongated lenses 44a is defined by convex curves and concave curves alternately connected, as shown in FIG. 17. A further preferred cross section for the elongated lenses 44a is defined by a part of a polygon, i.e. a plurality of straight lines, as illustrated in FIG. 18. Still another preferred cross section for the elongated lenses 44a is defined by a combination of straight lines and a convex curve, as shown in FIG. 19. If the cross section is partly defined by a part of a polygon or straight lines, it should have an appropriate shape, in order not to cause such luminance non-uniformity as shown in FIG. 28. As mentioned above, when the ratio of the angle components of α° to α°+10° is obtained for all the angles α° of 0 to 80°, the maximum value of the ratios of the angle components should preferably be 60% or less, preferably 50% or less and more preferably 40% or less. If the cross section of the elongated lenses includes some straight lines, the surfaces corresponding to the straight lines reflect the light at greatly different angles, thus diverging the light very much. In this case, the light propagates in various directions, and such luminance non-uniformity as shown in FIG. 28 is less conspicuous. A preferred shape is such a part of a polygon as shown in FIG. 18, consisting of straight lines inclined to the elongated lens formed surface at about 40°, about 30° and about 20° or straight lines inclined to the elongated lens formed surface at about 40°, about 30°, about 20° and about 0°. Another preferred shape is the one shown in FIG. 19, which satisfies this condition, too. With these construction, even if the ratio of the specific angle components of α° to α°+10° is large, such luminance non-uniformity as shown in FIG. 28 will not develop. This is because the light is reflected by the other angle components in a direction greatly different from the direction in which the light is reflected by the angle components of about α°.

The number of lines (sides) existing in the cross sections of FIGS. 18 and 19 is preferably 2 to 20, more preferably 3 to 15, more preferably 4 to 10. If the number of sides is too small, the light will not diverge in various directions, more possibly causing such luminance non-uniformity as shown in FIG. 28. On the other hand, if the number of sides is too large, it will be difficult to manufacture a light guide having elongated lenses 44a.

A light guide is preferably used if it has a cross section of a curved line shape in a first region near the primary light sources and a cross section of a substantially polygonal shape such as a substantially triangular shape in a second region adjacent to the first region. More specifically, a light guide is preferably used if the ratio of angle components of α° to α°+10° for all the angle components α° of 0 to 80°, measured for the left and right inclined surfaces of the elongated lenses 44a, is larger, at maximum, in the second region adjacent to the first region than in the first region near the primary light sources. In this case, the elongated lenses 44a having the curved line cross section diverges the light without causing luminance non-uniformity in the first region near the primary light sources, and the elongated lenses 14a having a substantially polygonal cross section (e.g., triangular one) converge the light in the second region adjacent to the first region. Thus, high luminance can be attained.

The pitch at which the elongated lenses 44a are arranged is preferably 10 to 100 µm, more preferably 10 to 80 µm, still more preferably 20 to 70 µm. In the present invention, the pitch of the elongated lenses 44a may be the same, may differ or may gradually change, over all the elongated lenses 44a, so long as it falls within the range specified above.

Figure 20:
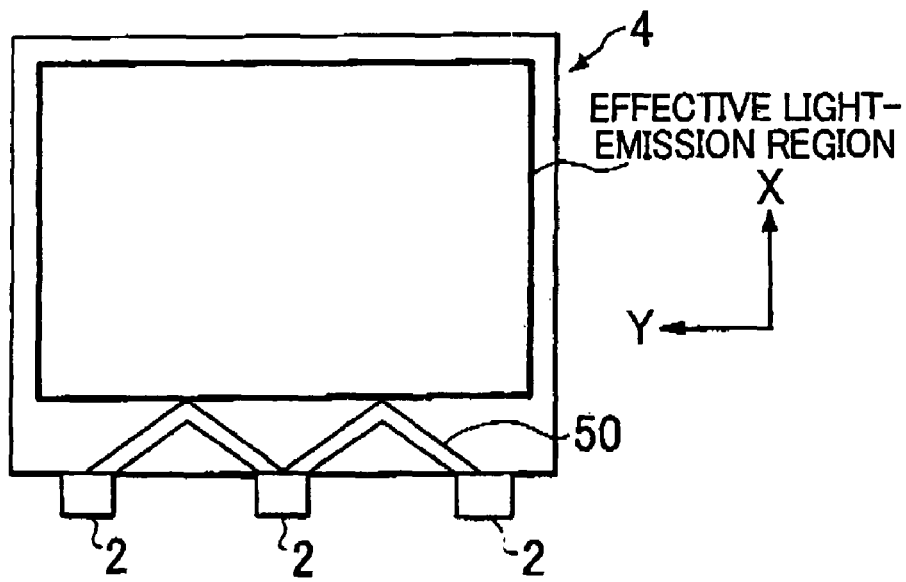
FIG. 20 is a plan view showing a light guide according to the present invention, together with primary light sources.

If the necessary spread angle is 110° or more, elongated lenses extending substantially in the direction of the directivity of the light introduced into the light guide may fail to make the light diverge sufficiently. If this is the case, it is recommendable to arrange, on the light-outgoing face or rear surface of the light guide 4, elongated lenses 50 that extend slantwise to the direction of the directivity of the light introduced into the light guide (i.e., X-axis direction) as is illustrated in FIG. 20. It is particularly desired that the elongated lenses should extend in almost the direction corresponding to the above necessary spread angle. Extending slantwise, the elongated lenses 50 can well reflect the light introduced into the light guide with so large angles that the elongated lenses 44a cannot reflect it. The light can therefore be appropriately reflected by the elongated lenses 44a. These elongated lenses 50 are formed, preferably in regions corresponding to those parts of the non-display region, which lies between the primary light sources. If the slant elongated lenses are not formed, these regions may be dark regions observed through the light deflection element 6, i.e., prism sheet. In these regions, there is light that does not travel perpendicular to the elongated prisms of the prism sheet. Hence, the dark regions shown in FIG. 27 can be diminished if the light is deflected in these regions. Preferably, in the slant elongated lenses, the ratio of the angle components of 20 to 50°, measured in the same way as in case of the elongated lenses 44a, is preferably 10 to 80%. If the ratio is too small, the slant elongated lens will change the propagation direction of the light but a little. If the ratio is too large, new bright lines will develop, possibly causing new luminance non-uniformity.

Figure 21:
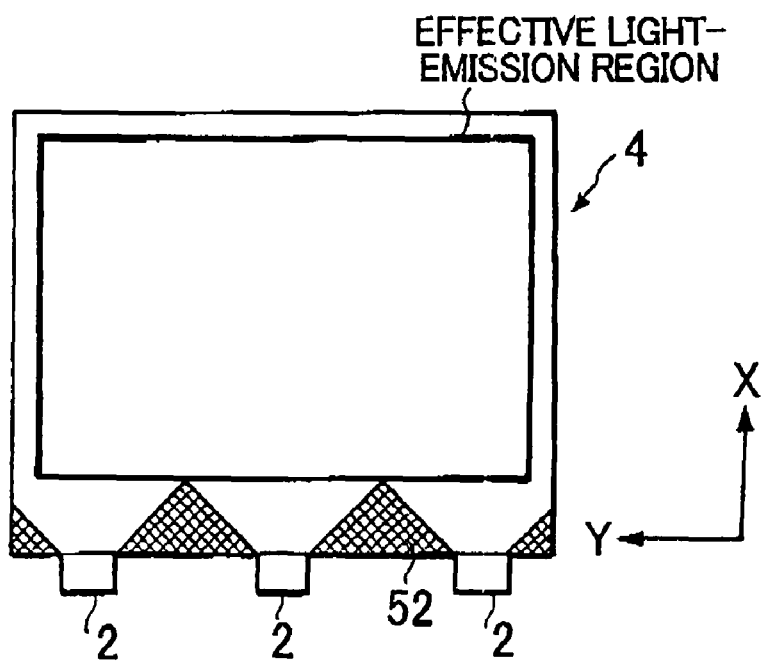
FIG. 21 is a plan view showing another light guide according to the present invention, together with primary light sources.

For the same purpose, such a dot pattern 52 as shown in FIG. 21 may be formed on the light-outgoing face or rear surface of the light guide 4. The dot pattern 52 can be formed by etching or laser process. The dot pattern 52 reflects the light components at so large an angle relative to the directivity of the light, that the elongated lenses 44a cannot appropriately reflect. The elongated lenses 44a can therefore appropriately reflect the light. The dots are formed, preferably in regions corresponding to those parts of the non-display region, which lie between the primary light sources. If the dot pattern is not formed, these regions may be dark regions observed through the prism sheet. In these regions, there is light that does not travel perpendicular to the elongated prisms of the prism sheet. Hence, the dark regions shown in FIG. 27 can be diminished if the light is deflected in these regions. Preferably, each dot has such a cross section perpendicular to a line connecting the dot and a primary light source, in which the ratio of the angle components of 20 to 80°, measured in the same way as in case of the elongated lenses 44a, is preferably 10 to 80%. If the ratio is too small, the dot pattern will change the propagation direction of the light but a little. If the ratio is too large, new bright lines will develop, possibly causing new luminance non-uniformity.

In this invention, a light-emitting mechanism is preferably provided on the light-outgoing face 43 of the light guide 4 as described above. The major surface (i.e., rear surface) opposed to the light-outgoing face 43 is preferably the elongated lens formed surface, on which elongated lenses 44a are formed. Instead, the light-outgoing face 43 may be used as an elongated lens formed surface, and a light-emitting mechanism having high light diffusion regions may be provided on the opposite major surface.

Figure 22:
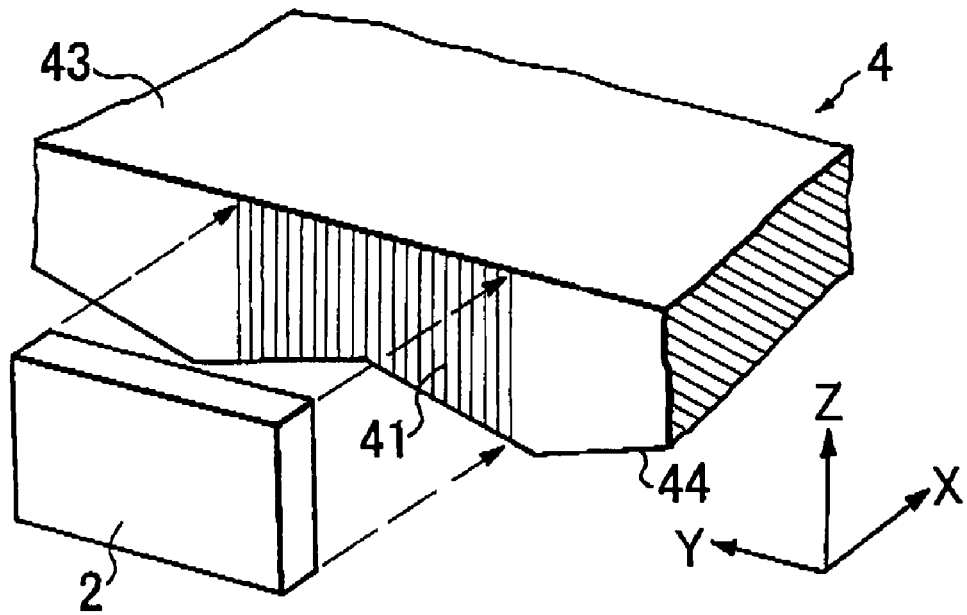
FIG. 22 is an exploded perspective view showing a part of a light guide according to the present invention, together with primary light source.

FIG. 22 is an exploded perspective view showing a part of a light guide according to this invention, together with the primary light source. In the present embodiment, the light-incoming end face 41 is an anisotropic rough surface. The anisotropic rough surface has an average inclination angle θa with respect to the Y-axis direction parallel to the light-outgoing face 43. This average inclination angle θa is greater than the average inclination angle θa with respect to the Z direction perpendicular to the light-outgoing face 43. Since the light-incoming end face 41 is rough, the light emitted from an LED 2 and introduced into the light guide 4 at the light-incoming end face 41 can diverge in the XY plane. Therefore, the light does neither diverge excessively in the XZ plane and accordingly, nor is excessively emitted from the light guide 4 in the vicinity of the light-incoming end face 41. Thus, the necessary intense light can be efficiently guided to a broad region on the light-outgoing face 43. This helps to enhance the luminance uniformity.

The anisotropic rough light-incoming end face 41 has an average inclination angle of preferably 3 to 30°, more preferably 4 to 25°, and still preferably 5 to 20°. If the average inclination angle is less than 3°, the above-mentioned effect may decrease. If the average inclination angle exceeds 30°, the light will not diverge more in the XY plane, inevitably reducing the luminance. To enhance the effect, it is desired that the average inclination angle should be 5° or less, preferably 3° or less, with respect to the Z direction that intersects at right angles to the light-outgoing face 43. Moreover, it is desired that the anisotropic rough light-incoming end face 41 should have a region inclined at 8° or more with respect to the Y-axis direction parallel to the light-outgoing face 43, a length of which is 5% or less of the measurement length of the face 41. If this region inclined at 8° or more has a length greater than 5% of the measurement length of the face 41, the light will excessively diverge in the XY plane and is excessively emitted from the light guide 4 in the vicinity of the light-incoming end face 41, inevitably reducing the luminance.

The anisotropic rough surface should preferably have a regular or irregular uneven structure composed of projections and depressions, extending in parallel to one another substantially in the Z direction. More precisely, the surface may be defined by elongated lenses that extend in parallel to one another substantially in the Z direction. The elongated lenses may be roughened at surface.

The light guide 4 according to the present invention may be made of synthetic resin that has high transmittance. Examples of such resin are methacrylic resin, acrylic resin, polycarbonate resin, polyester resin, vinyl chloride resin, and cyclic polyolefin resin. Methacrylic resin is most recommendable, because it excels in transmittance, thermal resistance, mechanical properties and process readiness. Methacrylic resin that contains at least 80 wt % of methyl methacrylate as main component is preferred. To provide a surface structure such as the rough surface or elongated prism formed structure on the light guide 4, or to provide an anisotropic rough surface structure on the light-incoming end face, a plate of transparent synthetic resin may be formed by hot press by using a mold that has a desired surface structure. Alternatively, the surface structure may be formed and shaped by means of screen printing, extrusion molding or injection molding. The surface structure may be formed by using heat- or ultraviolet-curable resin.

Figure 23:
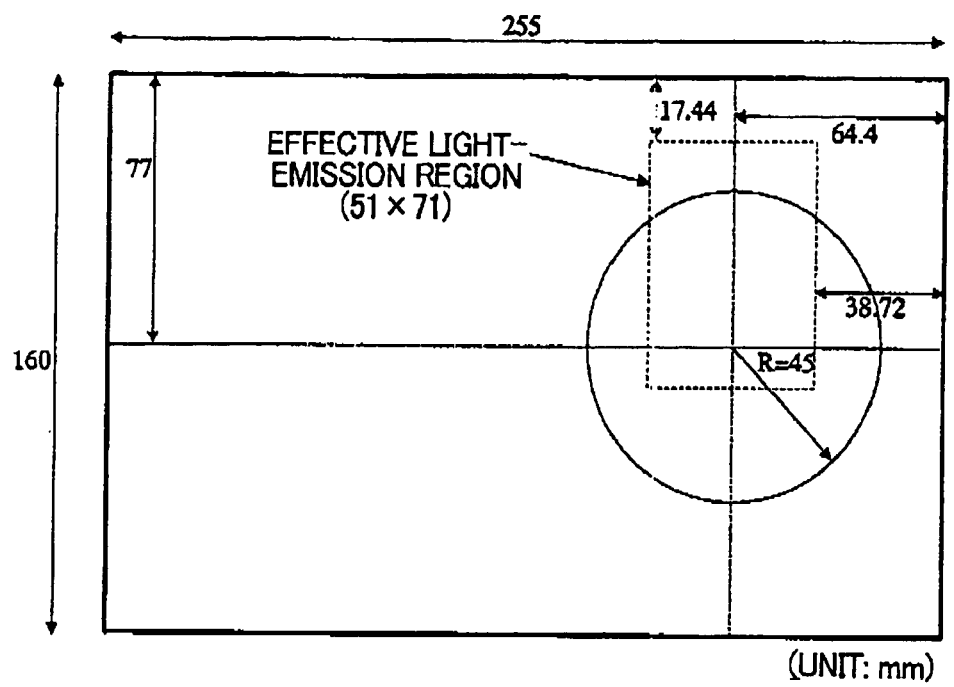
FIG. 23 is a diagram explaining a method of producing a mold for forming the light-outgoing face of a light guide according to the present invention.
Figure 24:
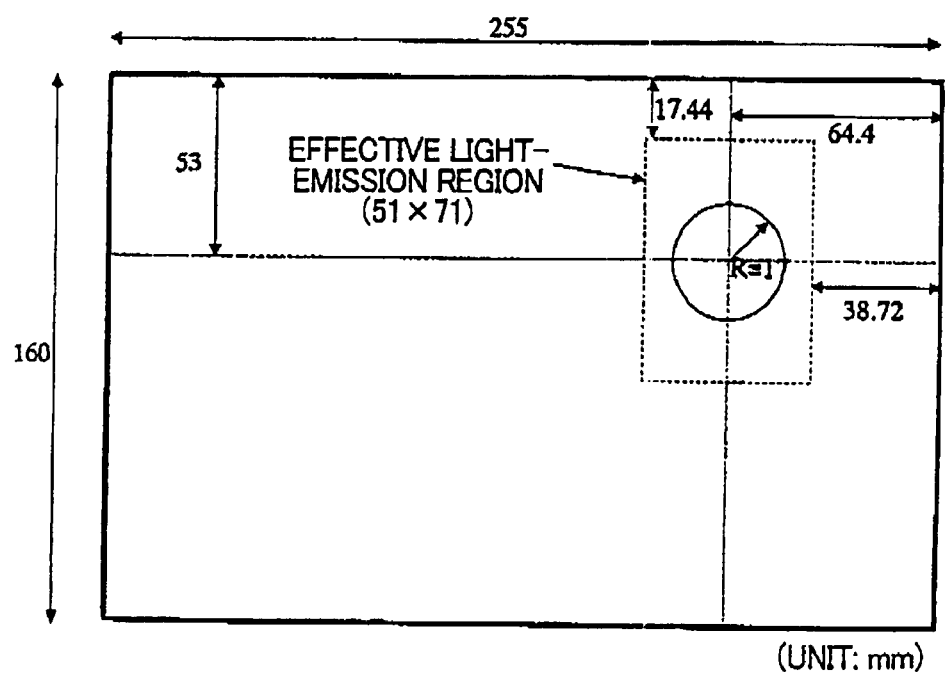
FIG. 24 is a diagram explaining a method of producing the mold for forming the light-outgoing face of the light guide according to the present invention.
Figure 25:
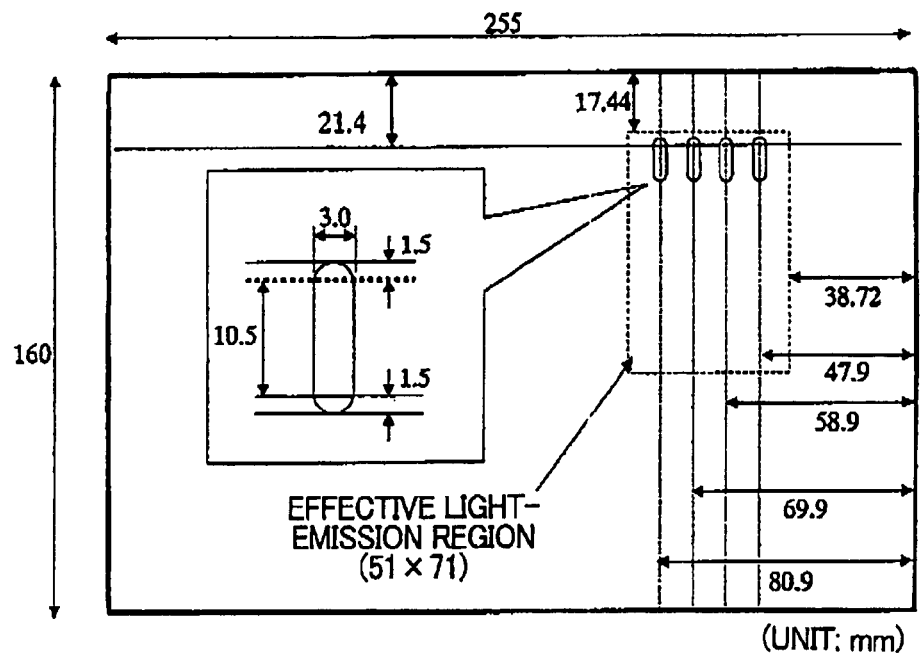
FIG. 25 is a diagram explaining a method of producing the mold for forming the light-outgoing face of the light guide according to the present invention.
Figure 26:
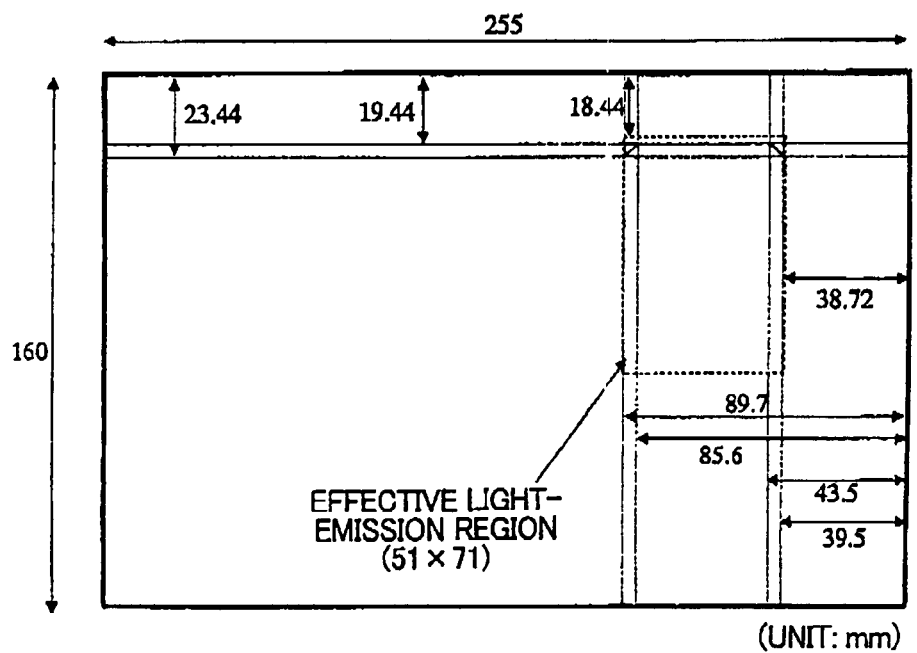
FIG. 26 is a diagram explaining a method of producing the mold for forming the light-outgoing face of the light guide according to the present invention.

A method of manufacturing such a mold will be explained. The high light diffusion regions 431 and other regions 432, 433 and 434, which constitute the light-emitting mechanism of the light guide 4 according to the present invention, are formed by transferring the shape of the shape-transfer surface formed in a mold. To form the shape-transfer surface in the mold, a shield having an opening or openings corresponding to the region or regions to be formed on the surface of mold is arranged, if the light-emitting mechanism is formed by a rough surface. The mold is thereby covered, except a part or parts corresponding to the above region or regions, and is then subjected to blast process or etching. If the mold is subjected to a blast process using fine particles, the shield is held at an appropriate distance from the surface of the mold. Then, a region (i.e., the above-mentioned boundary), in which the average inclination angle θa gradually decreases, can be formed around the above region. FIGS. 23 to 26 show specific examples of shields that are used in blast process to form a mold that has a shape-transfer surface for forming the light-outgoing face on the light guide. FIG. 23 shows a shield that has a circular opening having a radius (R) of 45 mm and corresponding to the regions 432 and 433 shown in FIG. 4. FIG. 24 shows a shield that has a circular opening having a radius (R) of 17 mm and corresponding to the region 432 shown in FIG. 4. FIG. 25 shows a shield that has four elongated openings each having a major axis 13.5 mm long and a minor axis 3 mm long and corresponding to the high light diffusion regions 431 shown in FIG. 4. FIG. 26 shows a shield that has two openings each shaped like an isosceles right triangle having 4 mm-long sides and corresponding to those two corner areas (not shown) of the light-outgoing face, which are near the light-incoming end face. A mold for forming an uneven or projection-depression structure composes of dots or conical projections may have, in its shape-transfer surface, recesses that are complementary to the dots or projections.

The shape of the elongated lenses 44a formed on the light guide according to the present invention may be changed in part, by various methods. One method is to perform a blast process, on a mold having an elongated lens shape-transfer surface made by cutting or etching, either in part or as a whole. Another method is to polish, in part or as a whole, a mold having an elongated lens shape-transfer surface and to transfer the shape of the polished mold. Still another method is to perform a blast process on a molding product produced by using a first mold having an elongated lens shape-transfer surface, either in part or as a whole, and to transfer the shape of the molding product, thereby obtaining a second mold having an elongated lens shape-transfer surface. Performing one of these methods or direct blast process on at least a part of the elongated lens formed surface of the light guide 4 to form a blasted surface, the distribution of ratio of angle components of the elongated lenses 44a or the inclination angle of the valleys can be changed.

The lenses provided on the light deflection element 6 may have various shapes, in accordance with the use of the surface light source device. They may be shaped like a prism, a lenticular lens, a fly-eye lens, a waving lens, or the like. A prism sheet consisting of a number elongated prisms, each having a substantially triangular cross section, is particularly desirable. Each elongated prism should have an apex angle of 50 to 80°, preferably 55 to 70°.

The light deflection element 6 according to the present invention can be made of synthetic resin slaving high transmittance. Examples of such resin are methacrylic resin, acrylic resin, polycarbonate resin, polyester resin, vinyl chloride resin, and cyclic polyolefin resin. Methacrylic resin is most recommendable, because it excels in transmittance, thermal resistance, mechanical properties and process readiness. Methacrylic resin that contains at least 80 wt % of methyl methacrylate as main component is preferred. To provide a surface structure, such as elongated prisms, on the light deflection element 6, a plate of transparent synthetic resin may be formed by hot press by using a mold that has a desired surface structure. Alternatively, the surface structure may be formed and shaped by means of screen printing, extrusion molding or injection molding, at the same time the element 6 is formed. The surface structure may be formed by using heat-curable or light-curable resin. The mold used may be produced by cutting or etching a work piece. Further, a rough-surface structure or elongated lens formed surface, made of active energy-beam-curable resin, may be formed on a transparent base such as transparent film or sheet made of polyester resin, acrylic resin, polycarbonate resin, vinyl chloride resin, polymethacrylimide resin or the like. Such a sheet may be bonded to a transparent base by means of adhesion, fusion or the like. The active energy-beam-curable resin may be multifunctional (meth)acrylic compound, vinyl compound, (meth)acrylic esters, allyl compound, metal salt of (meth) acrylic acid, or the like.

The light reflection element 8 may be a plastic sheet that has, for example, a metal reflecting layer vapor-deposited on the surface. In the present invention, the light reflection element a may not be a reflecting sheet, but a light-reflecting layer formed on the major surface 44 of the light guide 4, which faces away from the light-outgoing face. Preferably, a reflecting member may be formed on the four end faces of the light guide 4 (but not on the light-incoming end face 41).

EXAMPLES

Examples of the present invention will be described below. In the examples, the inclination angles of the cross-section segments of the light guide were measured as follows. A replica of the elongated lenses of the light guide was produced first. The replica was cut at a plane perpendicular to the direction in which the elongated lenses extended. The cut face was photographed with an optical microscope, an atomic microscope or the like, providing a magnified image of the cut face. The inclination angles of the cross-section segments were measured on the magnified image of the cut face. The frequency distribution of the absolute values of inclination angles for all segments and the inclination angles of the valleys were calculated by the method explained with reference to FIG. 6. If the cross section is divided into segments having equal length as described above, however, a complex process must be performed to measure the positions in coordinates that represent the shape of the cross section. In this case, the method described below may be used to measure the positions in coordinates.

First, the shape of cross section of the cut face is divided into segments having equal length in Y-axis direction. Next, the frequency distribution of the absolute values of inclination angles for all the segments is calculated in the same manner as described in the above. Then, on the basis of the frequency distribution thus calculated, a value of [the frequency]/[cosine of inclination angle] is obtained for each inclination angle. The sum of the values thus calculated is calculated for all the segments. Next, a value of [the frequency]/[cosine of inclination angle]/[the sum of the values calculated in the above] is obtained for each inclination angle. This value is the frequency distribution that is valid when the shape of cross section is divided into segments having equal length.

The average inclination angle was measured with a contact-stylus, surface-roughness meter (Surfcom 570A, Tokyo Seiki K.K.), using a 55° conical diamond needle (010-2528) having a diameter R of 1 μm, at a feed speed of 0.03 mm/sec, over a distance of 2 mm. The inclination of the referenced average line for the curve extracted was corrected. The center-line average values of curves obtained by differentiating the above curves were calculated in accordance with the equations (1) and (2) specified above.

Example 1

A surface of a stainless steel plate, 3 mm thick, mirror-polished, having an effective light-emission region having a size of 51 mm×71 mm, was masked with an adhesive tape over a region that extends from one short side (51 mm long, corresponding to the light-incoming end face) toward the effective light-emission region by 1 mm. The surface of the plate was then subjected to a first blast process under the following conditions and was thereby roughened. That is, the plate was blasted with glass beads (J220, Potters-Ballotini Co., Ltd.) applied through a nozzle spaced by 32 cm from the stainless steel plate, at pressure of 0.09 MPa, while moving the nozzle at 8.0 cm/s and moving the stainless steel plate in the Y-axis direction by 10 mm every time the nozzle moves across the plate. The part of the stainless steel plate, roughened by the first blast process, had an average inclination angle θa of 1.0°. The term "effective light-emission region" used in this specification and in the accompanying drawings with respect to a mold for forming the light guide or a blank of mold means a region of the mold or blank for forming an area of the light guide, which area corresponds to the light-emission region of the surface light source device. The terms "X-axis direction" and "Y-axis direction," both pertaining to the mold and the blank thereof, mean directions corresponding to the X-axis direction and Y-axis direction, respectively, pertaining to the light guide made by using the mold and shown in FIG. 1, et seq.

Next, a shield of the type shown in FIG. 23 was positioned, in a relationship to the effective light-emission region as shown in the figure, at 7 cm above the stainless steel plate subjected to the first blast process. Then, the second blast process was performed in the same way as the first blast process, except that the nozzle was moved at 6.0 cm/s. The part of the stainless steel plate, which had been subjected to the second blast process and thereby roughened, had an average inclination angle θa of 1.8°. Thereafter, a shield of the type shown in FIG. 24 was positioned, in a relationship to the effective light-emission region as shown in the figure, at 7 cm above the stainless steel plate subjected to the second blast process. The third blast process was performed in the same way as the second blast process. The part of the stainless steel plate, which had been subjected to the third blast process and thereby roughened, had an average inclination angle θa of 2.5°. Further, a shield of the type shown in FIG. 25 was positioned, in a relationship to the effective light-emission region as shown in the figure, at 5 cm above the stainless steel plate subjected to the third blast process. The fourth blast process was then performed in the same way as the second blast process, except that the nozzle was roved at 3.5 cm/s. The part of the stainless steel plate, which had been subjected to the fourth blast process and thereby roughened (and which corresponds to the high light diffusion region of the light-outgoing face), had an average inclination angle θa of 1.3°. A region about 2 mm wide, having an average inclination angle θa that gradually decreases, was formed around the high light diffusion region. Then, a shield of the type shown in FIG. 26 was positioned, in a relationship to the effective light-emission region as shown in the figure, at 2 cm above the stainless steel plate subjected to the fourth blast process. The fifth blast process was then performed in the same way as the second blast process, except that alumina particles having an average diameter of 30 μm (A400, Fujimi Incorporated) were applied through a nozzle at pressure of 0.6 MPa and the nozzle was moved at 1.5 cm/s. The part of the stainless steel plate, which had been subjected to the fifth blast process and thereby roughened (and which corresponds to two corner portions of the light-outgoing face and are located near the light-incoming end face), had an average inclination angle θa of 4°. Thus, the first mold was produced.

On the other hand, a quenched steel plate, 34 mm thick, mirror-polished, having an effective light-emission region of 51 mm×71 mm, was nickel-plated to have a nickel layer having thickness of 0.2 mm. The steel plate was then mirror-polished. On a surface of the steel plate, a symmetrical lens pattern consisting of elongated lenses arranged at pitch of 50 μm and extending parallel to the 71-mm long sides, was formed by cutting. Next, the steel plate was masked with an adhesive tape over a region that extends from one short side (51 mm long, corresponding to the light-incoming end face) by 3.5 mm. This plate was then subjected to a blast process, which was performed in the same way as the second blast process, except that glass beads having a particle diameter of 63 μm or less (J400, Potters-Ballotini Co., Ltd.) were applied at pressure of 0.2 MPa, while moving the nozzle at 3.8 cm/s. The second mold was thus formed, whose elongated lens-pattern transfer surface had been roughened in part.

Further, a quenched steel member, 34 mm thick, mirror-polished, having an effective light-emission region having a size of 0.85 mm×51 mm, was subjected to a blast process, which was performed in the same way as the second blast process, except that alumina particles having an average diameter of 30 μm (A400, Fujimi Incorporated) were applied at pressure of 0.008 MPa, while moving the nozzle at 5.0 cm/s and positioning the same 16 cm above the steel member. Thus, the third mold was produced.

Injection molding was carried out, using the first mold, the second mold and the third mold for, respectively, transferring the light-outgoing face of a light guide, transferring the rear surface of the light guide and forming the light-incoming end face of the light guide. As a result, a transparent light guide was produced, which was made of transparent acrylic resin, shaped like a wedge, having 51-mm short sides and 71-mm long sides and thickness gradually decreasing from 0.85 mm (at the light-incoming end face) to 0.6 mm (at the opposite end face). One major surface of the light guide was a light-outgoing face having a high light diffusion region near the light-incoming end face. The other major surface of the light guide was an elongated lens formed surface.

Four LEDs (NECW008A, Nichia Corporation) were arranged at intervals of 11 mm, facing a 0.85-mm thick short side end face (light-incoming end face) of the light guide. A diffusive reflection sheet (75W05, Reiko Co., Ltd.) was laid on the elongated lens formed surface of the light guide. On the light-outgoing face of the light guide, a prism sheet (M168YS, Mitsubishi Rayon Co., Ltd.) having many elongated prisms arranged at pitch 18 μm, each having an apex angle of 68°, was laid with its elongated prism formed surface facing the light-outgoing face. Thus, a planar light source device was manufactured.

The planar light source device car be combined with a liquid crystal display device to provide a liquid crystal display which has an effective display region having a size of 46 mm×61 mm and in which the light-incoming end face of the light guide is spaced by 6.25 mm from the effective display region.

The light guide produced had an elongated lens formed surface having the following cross-sectional share.

Region A: Extending 3.5 mm from the light-incoming end face

Curve convex outwards

Frequency distribution of the absolute value of inclination angles:

20° to 50°: 67%
25° to 50°: 51%
30° to 50°: 39%
35° to 50°: 26%
40° to 50°: 8%
15° or less: 33%
35° to 60°: 26%
40° to 60°: 8%

Maximum of the ratio of angle components of α° to α°+10°: 31% (α°=31°)

Inclination angle of the valleys: 31°

Region B: Region other than region A

Curve convex outwards

Frequency distribution of the absolute value of inclination angles:

30° to 50°: 26%

Inclination angle of the valleys: 12°

All LEDs were turned on, making the surface light source device emits light. The effective light-emission region of the device was examined for luminance non-uniformity. Such dark regions as shown in FIG. 27, such bright lines as shown in FIG. 28, such luminance non-uniformity as shown in FIG. 29, resulting from the overlapping light beams from the light sources, such bright lines as shown in FIG. 30, or dark regions in front of the LEDs were not observed at all.

Example 2

A surface light source device was manufactured in the same way as in Example 1, except that the nozzle was moved at 5.0 cm/s in the fourth blast process. The high light diffusion region of the light guide produced had an average inclination angle θa of 1.5°. All LEDs were turned on, making the surface light source device emits light. The effective light-emission region of the device was examined for luminance non-uniformity. Such dark regions as shown in FIG. 27, such bright lines as shown in FIG. 28, such luminance non-uniformity as shown in FIG. 29, resulting from the overlapping light beams from the light sources, such bright lines as shown in FIG. 30, or dark regions in front of the LEDs were not observed at all.

Example 3

A surface light source device wan manufactured in the same way as in Example 1, except that particles were applied at pressure of 0.15 MPa in the fourth blast process. The high light diffusion region of the light guide produced had an average inclination angle θa of 1.7°. All LEDs were turned on, making the surface light source device emits light. The effective light-emission region of the device examined for luminance non-uniformity. Such dark regions as shown in FIG. 27, such bright lines as shown in FIG. 28, such luminance non-uniformity as shown in FIG. 29, resulting from the overlapping light beams from the light sources, such bright lines as shown in FIG. 30, or dark regions in front of the LEDs were not observed at all.

Comparative Example 1

A surface light source device was manufactured in the same way as in Example 1, except that the fourth blast process was not performed. All LEDs were turned on, making the surface light source device emits light. The effective light-emission region of the device was examined for luminance non-uniformity. Dark regions were observed in front of the respective LEDs.

What is claimed is:

1. A light guide for use in surface light source devices, which is shaped like a plate, designed to guide light emitted from a plurality of spot-like primary light sources, comprising:
    a light-incoming end face for receiving the light from the primary light sources;
    a light-outgoing face for emitting the light guided in the light guide;
    a rear surface located opposite to the light-outgoing face;
    a low light diffusion region having an average inclination angle; and
    a plurality of high light diffusion regions,
    wherein the low light diffusion region and the high light diffusion regions are formed on at least one of the light-outgoing face and the rear surface, so that the high light diffusion regions are isolated from one another with the low light diffusion region interposed therebetween,
    wherein the high light diffusion regions are disposed in the vicinity of the light-incoming end face so as to extend substantially in a direction of the directivity of the light introduced into the light guide within a plane extending along the light-outgoing face, and have a larger average inclination angle than that of the low light diffusion region, and
    wherein the high light diffusion regions are provided corresponding to the respective primary light sources, and each high light diffusion region and the corresponding primary light source are positioned on a line extending in the direction of the directivity regarding the corresponding primary light source.

2. The light guide for use in surface light source devices, according to claim 1, wherein the high light diffusion regions extend in parallel to one another.

3. The light guide for use in surface light source devices, according to claim 1, wherein a difference in average inclination angle between the high light diffusion region and the adjacent region thereof is 0.1 to 1°.

4. The light guide for use in surface light source devices, according to claim 1, wherein a surface on which the high light diffusion region is formed includes at least one part which is other than the high light diffusion region and which is a rough surface or an uneven structure surface.

5. The light guide for use in surface light source devices, according to claim 4, wherein the surface on which the high light diffusion region is formed includes a region of larger average inclination angle located at a center thereof and a region of smaller average inclination angle located around the high light diffusion region and near the light-incoming end face.

6. The light guide for use in surface light source devices, according to claim 1, wherein a plurality of elongated uneven structures are formed on a surface opposite to the surface on which the high light diffusion region is formed, the elongated uneven structures being arranged substantially in parallel to one another and extending substantially along the direction of the directivity of light introduced into the light guide within a plane extending along the light-outgoing face.

7. The light guide for use in surface light source devices, according to claim 6, wherein each elongated uneven structure has, at least in the vicinity of the primary light source, a cross section intersecting at right angle with the extending direction of the elongated uneven structure, the cross section being composed of segments for each of which an inclination angle is defined by tangent of the segment and a plane of the surface of elongated uneven structure, and a ratio of the number of the segments having absolute value of the inclination angle of 20° to 50° relative to the number of all the segments is at least 10%.

8. The light guide for use in surface light source devices, according to claim 6, wherein the surface on which the elongated uneven structures are formed has a region A located near the primary light source and having the elongated uneven structures, and a region B located close to the region A and having the elongated uneven structures, and the regions A and B differ in the shape of the cross section from each other.

9. A surface light source device comprising:
    the light guide according to any one of claims 1, and 2 to 8;
    the plurality of spot-like primary light sources arranged near the light-incoming end face of the light guide; and
    an optical deflection element arranged adjacent to the light-outgoing face of the light guide, which has a light-incidence surface opposed to the light-outgoing face of the light guide, a light-emitting surface opposed to the light-incidence surface, and a plurality of elongated lenses formed on the light-incidence surface so as to extend substantially in parallel to the light-incoming end face of the light guide and in parallel to one another.

* * * * *